US012701429B2

(12) United States Patent
Fujishiro et al.

(10) Patent No.: US 12,701,429 B2
(45) Date of Patent: Aug. 4, 2026

(54) COMMUNICATION CONTROL METHOD, WIRELESS TERMINAL, BASE STATION, AND RIS DEVICE

(71) Applicant: KYOCERA Corporation, Kyoto (JP)

(72) Inventors: Masato Fujishiro, Yokohama (JP); Hiromichi Yoshikawa, Yokohama (JP); Chiharu Yamazaki, Tokyo (JP); Nobuki Hiramatsu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 320 days.

(21) Appl. No.: 18/518,057

(22) Filed: Nov. 22, 2023

(65) Prior Publication Data

US 2024/0089744 A1 Mar. 14, 2024

Related U.S. Application Data

(63) Continuation of application No. PCT/JP2022/018583, filed on Apr. 22, 2022.

(30) Foreign Application Priority Data

May 27, 2021 (JP) ................................. 2021-089607

(51) Int. Cl.
*H04W 16/26* (2009.01)
*H04W 76/10* (2018.01)
*H04W 76/27* (2018.01)

(52) U.S. Cl.
CPC ........... *H04W 16/26* (2013.01); *H04W 76/10* (2018.02); *H04W 76/27* (2018.02)

(58) Field of Classification Search
CPC .. H04B 7/04013; H04W 16/26; H04W 24/02; H04W 76/10; H04W 76/27; H04W 8/22
See application file for complete search history.

(56) References Cited

U.S. PATENT DOCUMENTS 6,438,375 B1 8/2002 Muller
9,648,445 B2 5/2017 Jang et al.
(Continued)

FOREIGN PATENT DOCUMENTS

CN 111245494 A 6/2020
JP 2011-211515 A 10/2011
(Continued)

OTHER PUBLICATIONS

Qingqing WU et al., "Intelligent Reflecting Surface-Aided Wireless Communications: A Tutorial", IEEE Transactions on Communications, vol. 69, No. 5, May 2021, pp. 3313-3351.
(Continued)

*Primary Examiner* — Ji-Hae Yea
(74) *Attorney, Agent, or Firm* — Studebaker Brackett PLLC

(57) ABSTRACT

A communication control method used in a mobile communication system including a gNB and a UE performing wireless communication with the gNB, the communication control method including: establishing, by an RIS-UE, a wireless connection with the gNB, the RIS-UE controlling an RIS device that changes a propagation direction of a radio wave incident from the gNB; and transmitting, by the gNB to the RIS-UE through the wireless communication, one or more pieces of RIS control information used to control the RIS device.

8 Claims, 23 Drawing Sheets

(56)  References Cited

U.S. PATENT DOCUMENTS

| | | |
|---|---|---|
| 10,111,165 B2 | 10/2018 | Jang et al. |
| 10,694,456 B2 | 6/2020 | Jang et al. |
| 11,445,416 B2 | 9/2022 | Fujishiro |
| 11,546,842 B2 | 1/2023 | Jang et al. |
| 2010/0159928 A1 | 6/2010 | Wu |
| 2011/0244786 A1 | 10/2011 | Fujii et al. |
| 2021/0337617 A1 | 10/2021 | Bao et al. |
| 2022/0393756 A1 | 12/2022 | Matsumura et al. |
| 2023/0337158 A1* | 10/2023 | Zhang ................. H04L 27/2613 |

FOREIGN PATENT DOCUMENTS

| | | | |
|---|---|---|---|
| JP | 2018-032997 A | 3/2018 | |
| JP | 2020-018016 A | 1/2020 | |
| WO | 2019/102964 A1 | 5/2019 | |
| WO | 2021/095181 A1 | 5/2021 | |
| WO | WO-2021236510 A1 * | 11/2021 | ......... H04B 7/04013 |
| WO | WO-2022178747 A1 * | 9/2022 | ........... H04B 7/0691 |

OTHER PUBLICATIONS

ZTE, Sanechips; "Support of Reconfigurable Intelligent Surface for 5G Advanced"; 3GPP TSG RAN Meeting #91e; RP-210618; Electronic Meeting; Mar. 16-21, 2021; pp. 1-7.

* cited by examiner

RIS CONTROL CONFIGURATION
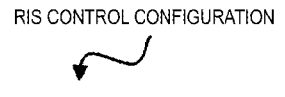
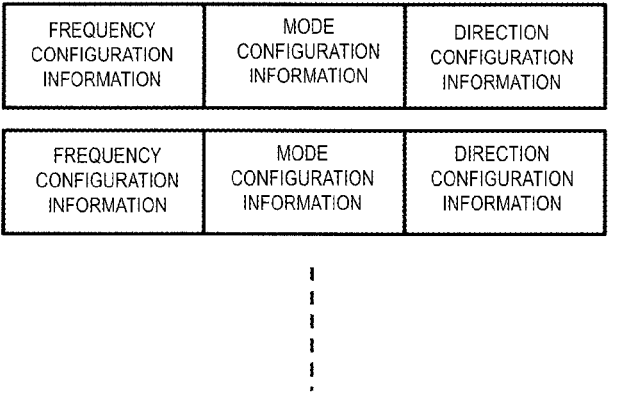
| FREQUENCY CONFIGURATION INFORMATION | MODE CONFIGURATION INFORMATION | DIRECTION CONFIGURATION INFORMATION |
|---|---|---|
| FREQUENCY CONFIGURATION INFORMATION | MODE CONFIGURATION INFORMATION | DIRECTION CONFIGURATION INFORMATION |
FIG. 11
RIS CONTROL CONFIGURATION         RIS CONTROL CONFIGURATION
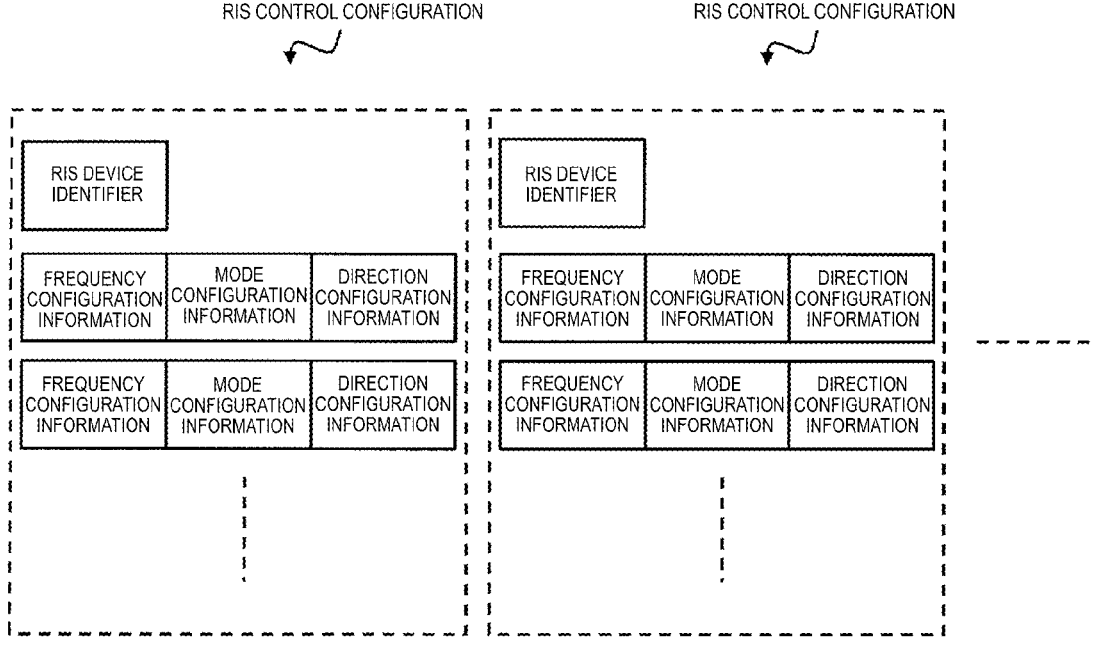
FIG. 12

RIS DEVICE CAPABILITY INFORMATION

| SUPPORTED FREQUENCY INFORMATION | MODE CAPABILITY INFORMATION | ANGLE CAPABILITY INFORMATION | CONTROL DELAY INFORMATION | ATTENUATION CHARACTERISTIC INFORMATION |
|---|---|---|---|---|

RIS DEVICE CAPABILITY INFORMATION

| RIS DEVICE IDENTIFIER | SUPPORTED FREQUENCY INFORMATION | MODE CAPABILITY INFORMATION | ANGLE CAPABILITY INFORMATION | CONTROL DELAY INFORMATION | ATTENUATION CHARACTERISTIC INFORMATION |
|---|---|---|---|---|---|
| RIS DEVICE IDENTIFIER | SUPPORTED FREQUENCY INFORMATION | MODE CAPABILITY INFORMATION | ANGLE CAPABILITY INFORMATION | CONTROL DELAY INFORMATION | ATTENUATION CHARACTERISTIC INFORMATION |

FIG. 15

CONTROL STATE INFORMATION

| FREQUENCY STATE INFORMATION | MODE STATE INFORMATION | DIRECTION STATE INFORMATION |
|---|---|---|

FIG. 16

CONTROL STATE INFORMATION

| RIS DEVICE IDENTIFIER | FREQUENCY STATE INFORMATION | MODE STATE INFORMATION | DIRECTION STATE INFORMATION |
|---|---|---|---|
| RIS DEVICE IDENTIFIER | FREQUENCY STATE INFORMATION | MODE STATE INFORMATION | DIRECTION STATE INFORMATION |

COMMUNICATION CONTROL METHOD, WIRELESS TERMINAL, BASE STATION, AND RIS DEVICE

RELATED APPLICATIONS

The present application is a continuation based on PCT Application No. PCT/JP2022/018583, filed on Apr. 22, 2022, which claims the benefit of Japanese Patent Application No. 2021-089607 filed on May 27, 2021. The content of which is incorporated by reference herein in their entirety.

TECHNICAL FIELD

The present disclosure relates to a communication control method, a wireless terminal, a base station, and an RIS device used in a mobile communication system.

BACKGROUND OF INVENTION

In recent years, a mobile communication system of the fifth generation (5G) has been attracting attention. New Radio (NR), which is a radio access technology of the 5G system, is capable of wide-band transmission via a high frequency band as opposed to Long Term Evolution (LTE), which is a fourth-generation radio access technology.

Since radio waves in the high frequency band such as a millimeter wave band or a terahertz wave band have high rectilinearity, reduction of coverage of a base station is a problem. In order to solve such a problem, a Reconfigurable Intelligent Surface (RIS) device using a metasurface technology has been attracted attention (for example, see Non-Patent Document 1). According to such an RIS device, the coverage of the base station can be extended by dynamically changing a propagation direction of a radio wave (beam) incident from the base station by way of reflection or refraction, for example.

CITATION LIST

Non-Patent Literature

Non-Patent Document 1: 3GPP Contribution: RP-210618, "Support of Reconfigurable Intelligent Surface for 5G Advanced"

SUMMARY

In a first aspect, a communication control method is a method used in a mobile communication system including a base station and a wireless terminal performing wireless communication with the base station. The communication control method includes: establishing, by a Reconfigurable Intelligent Surface (RIS) wireless terminal, a wireless connection with a base station, the RIS wireless terminal being a wireless terminal controlling an RIS device that changes a propagation direction of a radio wave incident from the base station; and transmitting, by the base station to the RIS wireless terminal through the wireless communication, one or more pieces of RIS control information used to control the RIS device.

In a second aspect, a wireless terminal is an apparatus for performing wireless communication with a base station in a mobile communication system. The wireless terminal includes: a receiver that receives, from a base station through wireless communication, one or more pieces of Reconfigurable Intelligent Surface (RIS) control information used to control an RIS device that changes a propagation direction of a radio wave incident from the base station; and a controller that controls the RIS device based on the one or more pieces of RIS control information.

In a third aspect, a base station is an apparatus for performing wireless communication with a wireless terminal in a mobile communication system. The base station includes: a transmitter that transmits, to a wireless terminal through wireless communication, one or more pieces of Reconfigurable Intelligent Surface (RIS) control information used to control an RIS device, the wireless terminal controlling the RIS device that changes a propagation direction of a radio wave incident from the base station.

In a fourth aspect, a Reconfigurable Intelligent Surface (RIS) device used in a mobile communication system includes: a metasurface that changes a propagation direction of an incident radio wave; and a controller that controls the metasurface in response to an indication from a wireless terminal including one or more terminal antennas to perform wireless communication with a base station. The one or more terminal antennas are arranged on the metasurface.

BRIEF DESCRIPTION OF THE DRAWINGS

FIG. 11 is a diagram illustrating a configuration of an RIS control configuration according to an embodiment.

FIG. 12 is a diagram illustrating a configuration of an RIS control configuration according to an embodiment.

FIG. 15 is a diagram illustrating a configuration of RIS device capability information according to an embodiment.

FIG. 16 is a diagram illustrating a configuration of control state information according to an embodiment.

DESCRIPTION OF EMBODIMENTS

A mobile communication system according to an embodiment is described with reference to the drawings. In the description of the drawings, the same or similar parts are denoted by the same or similar reference signs.

Efficient coverage extension may be achieved using an RIS device by operating an RIS device in coordination with an operation of a base station. However, when the base station and the RIS device are connected to each other by wiring to communicate with each other, a problem is that the installation cost of the RIS device due to wiring work or the like increases and the degree of freedom of installation of the RIS device decreases.

In the following embodiment, a description is given of a communication control method, a wireless terminal, a base station, and an RIS device that can realize efficient coverage extension using the RIS device while suppressing the increase in the installation cost and the decrease in the degree of freedom of the installation of the RIS device.

EMBODIMENTS

Configuration of Mobile Communication System

Figure 1:
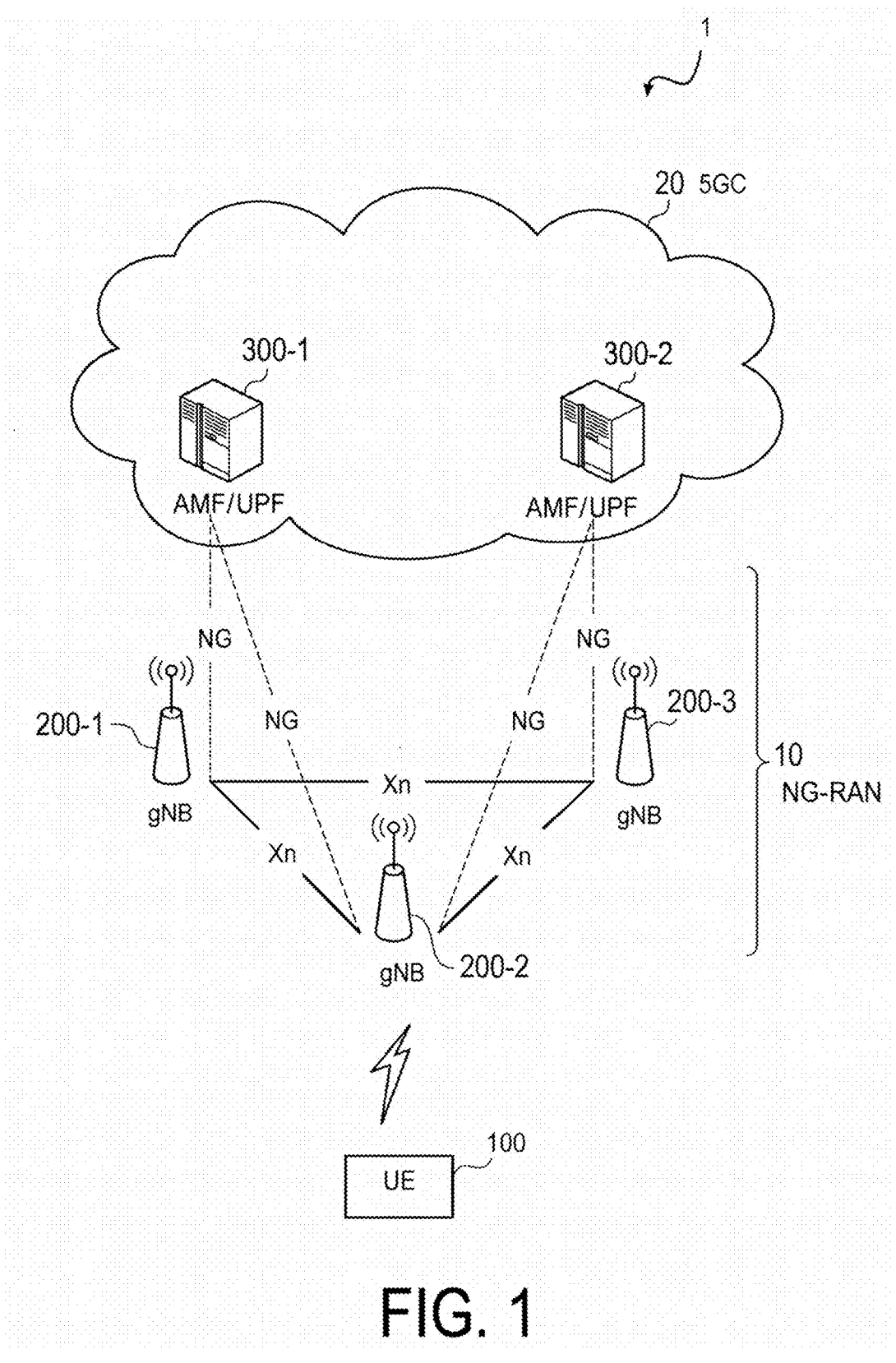
FIG. 1 is a diagram illustrating a configuration of a mobile communication system according to an embodiment.

First, a configuration of a mobile communication system in an embodiment is described. FIG. 1 is a diagram illustrating a configuration of a mobile communication system 1 according to an embodiment. The mobile communication system 1 complies with the 5th Generation System (5GS) of the 3GPP standard. The description below takes the 5G/NR as an example, but the 4G/LTE or the sixth generation (6G) system may be at least partially applied to the mobile communication system 1.

The mobile communication system 1 includes a wireless terminal (User Equipment (UE) 100, a 5G radio access network (Next Generation Radio Access Network (NG-RAN)) 10, and a 5G Core Network (5GC) 20.

The UE 100 is a mobile wireless communication apparatus. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. The gNB 200 manages one or more cells. The gNB 200 performs wireless communication with the UE 100 that has established a connection to the cell of the gNB 200.

The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
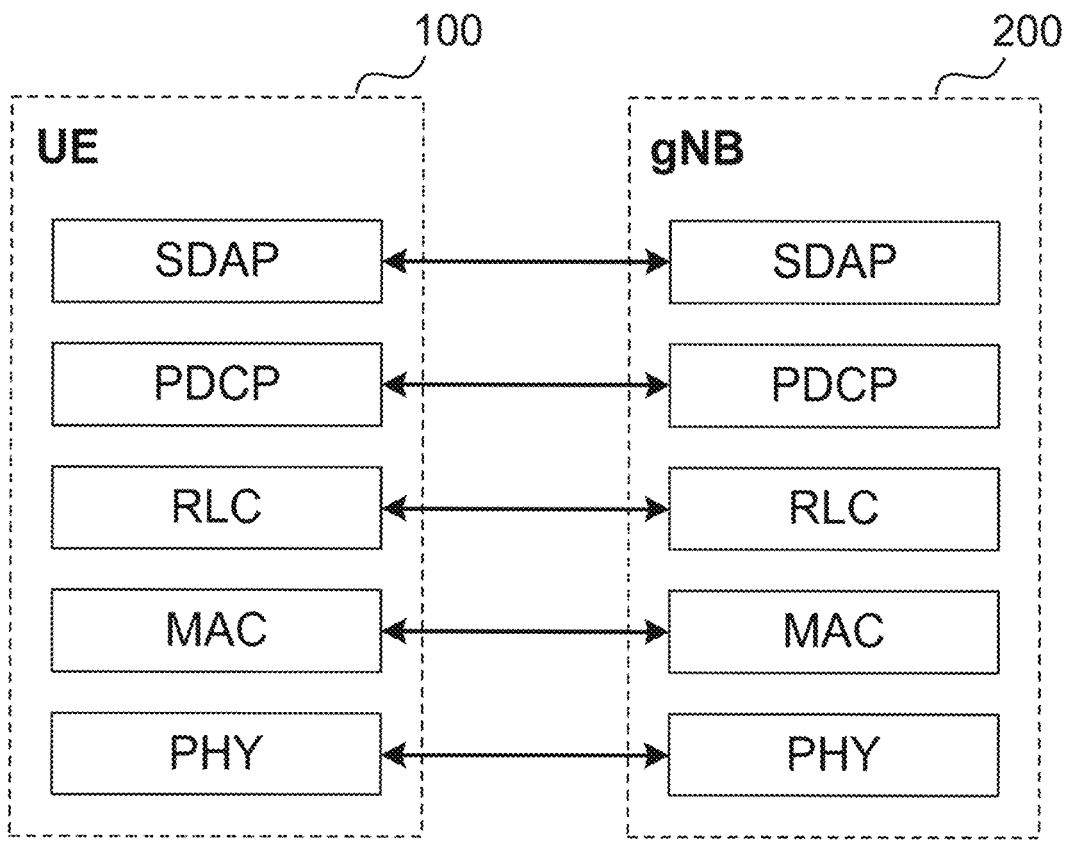
FIG. 2 is a diagram illustrating a configuration of a protocol stack of a radio interface of a user plane handling data.

FIG. 2 is a diagram illustrating a configuration of a protocol stack of a radio interface of a user plane handling data.

As illustrated in FIG. 2, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink, and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of QoS control by a core network and a radio bearer as the unit of QoS control by an Access Stratum (AS). Note that, when the RAN is connected to the EPC, the SDAP need not be provided.

Figure 3:
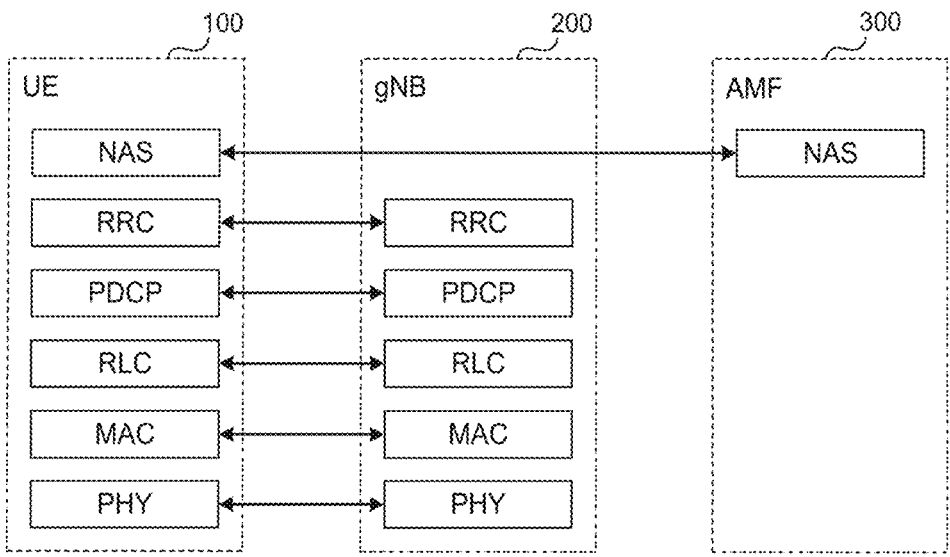
FIG. 3 is a diagram illustrating a configuration of a protocol stack of a radio interface of a control plane handling signaling (control signal).

FIG. 3 is a diagram illustrating a configuration of a protocol stack of a radio interface of a control plane handling signaling (a control signal).

As illustrated in FIG. 3, the protocol stack of the radio interface of the control plane includes a Radio Resource Control (RRC) layer and a Non-Access Stratum (NAS) layer instead of the SDAP layer illustrated in FIG. 2.

RRC signaling for various configurations is transmitted between the RRC layer of the UE 100 and the RRC layer of the gNB 200. The RRC layer controls a logical channel, a transport channel, and a physical channel in response to establishment, reestablishment, and release of a radio bearer. When a wireless connection between the RRC of the UE 100 and the RRC of the gNB 200 (RRC connection) exists, the UE 100 is in an RRC connected state. When the wireless connection between the RRC of the UE 100 and the RRC of the gNB 200 (RRC connection) does not exist, the UE 100 is in an RRC idle state. When the wireless connection between the RRC of the UE 100 and the RRC of the gNB 200 is suspended, the UE 100 is in an RRC inactive state.

The NAS layer which is positioned higher than the RRC layer performs session management, mobility management, and the like. NAS signaling is transmitted between the NAS layer of the UE 100 and the NAS layer of the AMF 300. Note that the UE 100 includes an application layer other than the protocol of the radio interface.

Application Scenario for RIS Device

Figure 4:
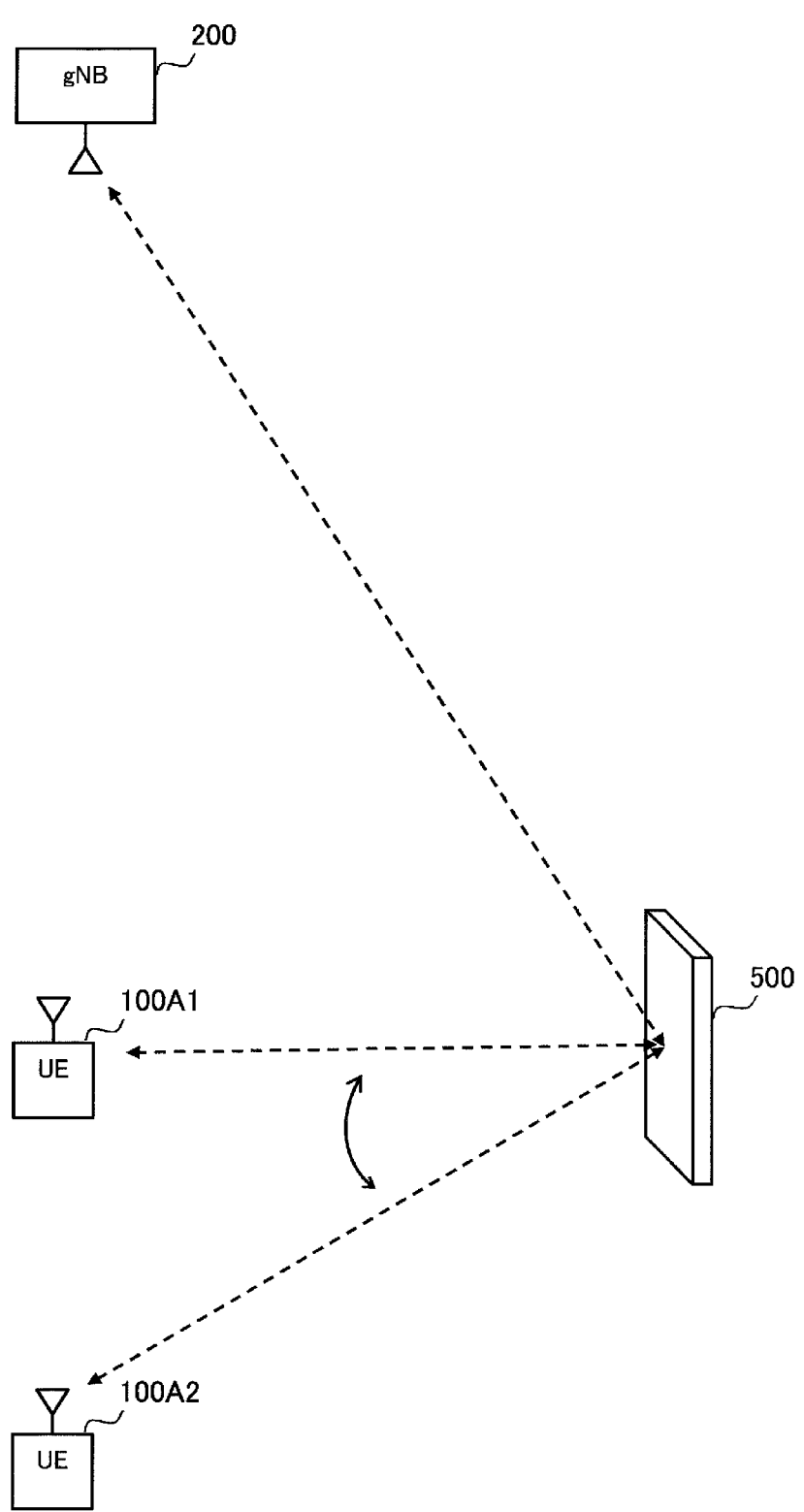
FIG. 4 is a diagram illustrating an application scenario for an RIS device according to an embodiment.
Figure 5:
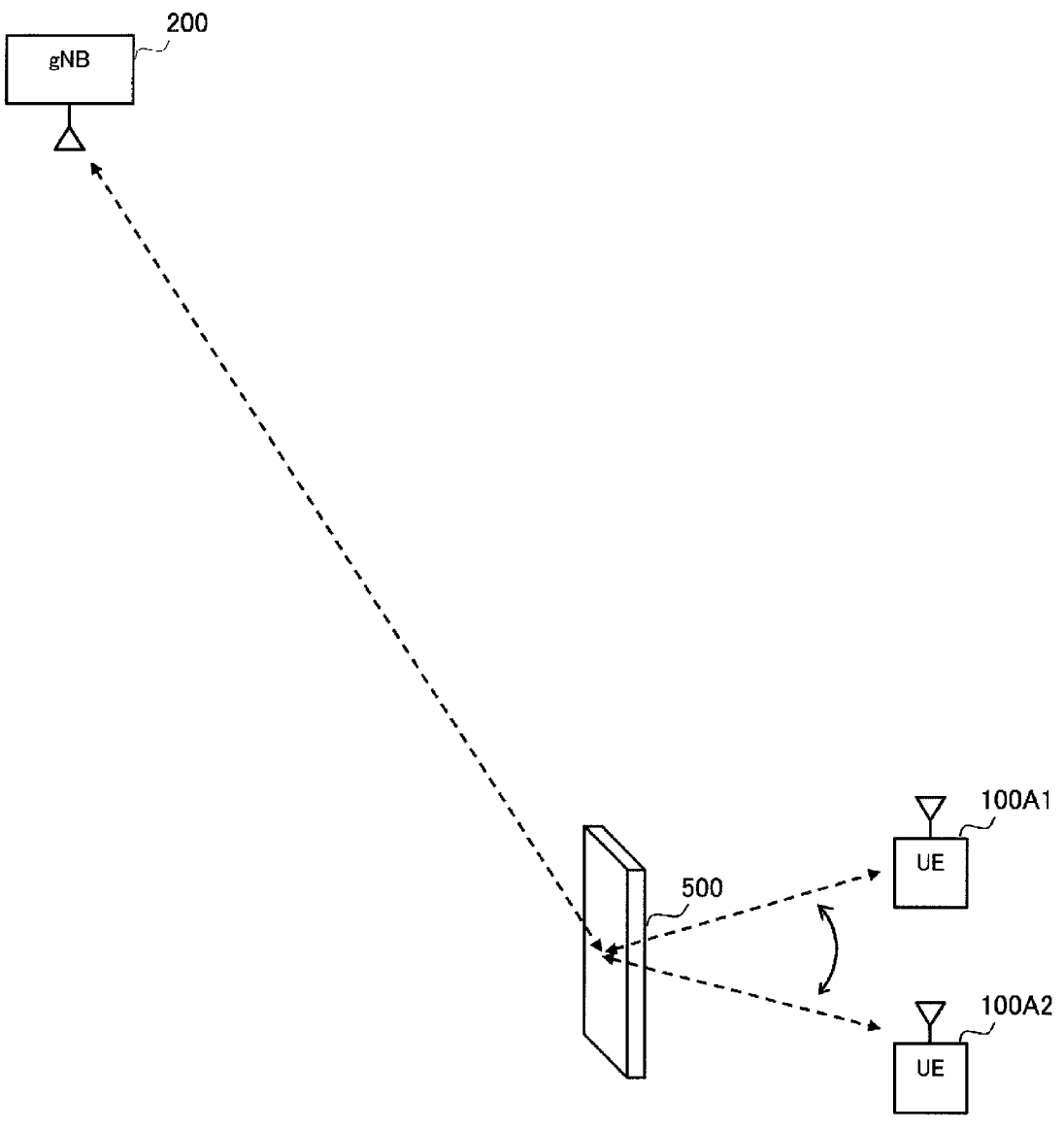
FIG. 5 is a diagram illustrating an application scenario for an RIS device according to an embodiment.
Figure 6:
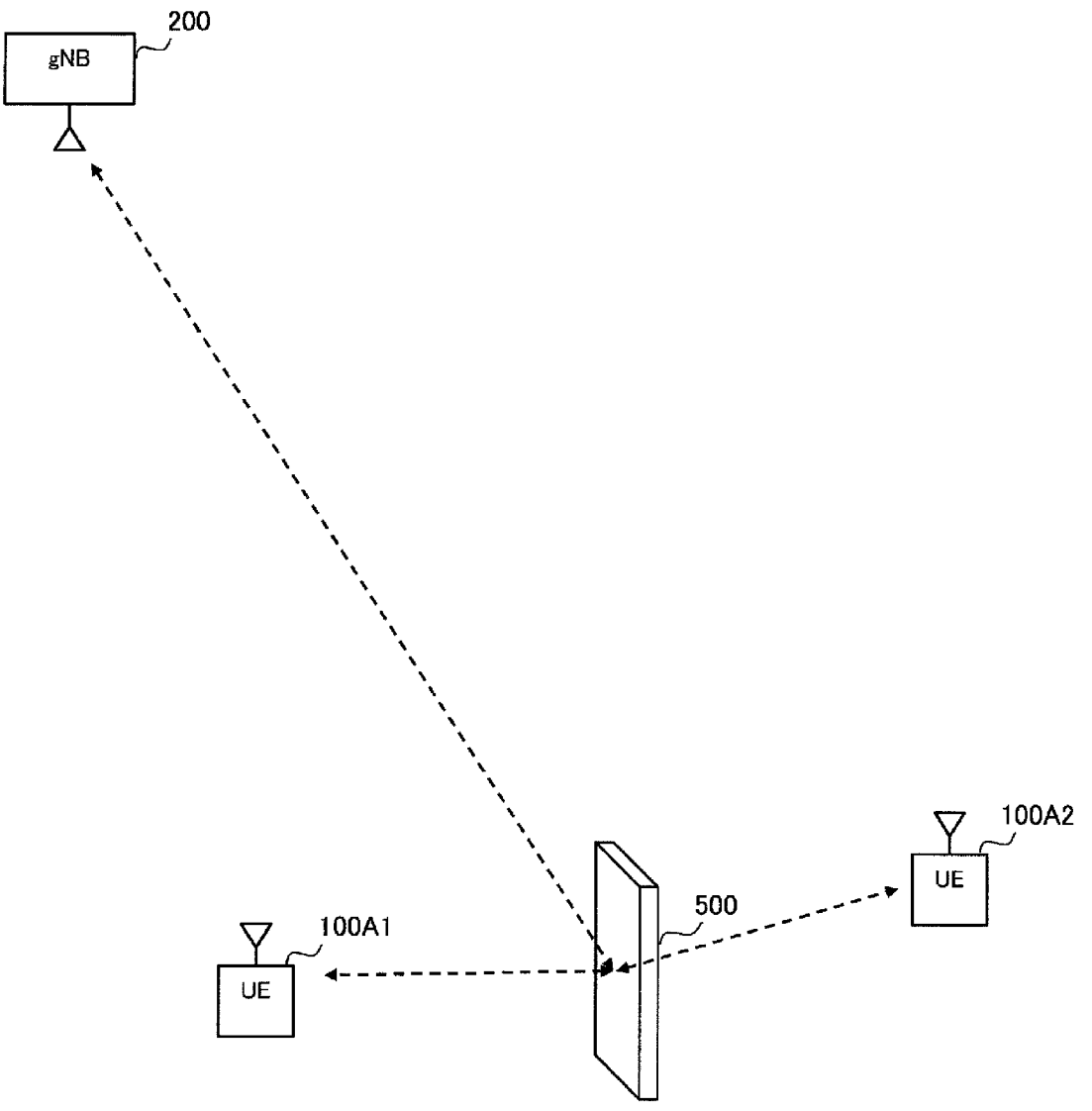
FIG. 6 is a diagram illustrating an application scenario for an RIS device according to an embodiment.

An application scenario for the RIS device in an embodiment is described. FIGS. 4 to 6 are diagrams illustrating application scenarios for the RIS device according to an embodiment.

The 5G/NR is capable of wide-band transmission via a high frequency band compared to the 4G/LTE. Since radio waves in the high frequency band such as a millimeter wave band or a terahertz wave band have high rectilinearity, a problem is reduction of coverage of the gNB 200. In FIGS. 4 to 6, it is assumed that obstacles exist between the gNB 200, and a UE 100A1 and a UE 100A2, and the UE 100A1 and the UE 100A2 cannot communicate with the gNB 200 within a line of sight. In this case, locations of the UE 100A1 and the UE 100A2 may be coverage holes.

An RIS device 500 using a metasurface technology is introduced into the mobile communication system 1. The RIS device 500 dynamically changes a propagation direction of a radio wave (beam) incident from the gNB 200 by way of reflection or refraction, for example. This can efficiently extend the coverage of the gNB 200. The RIS device 500 has characteristics such as Reconfigurable, Dynamic (dynamically controllable), and Flexible (controllable in beam direction). Although FIGS. 4 and 5 illustrate an example in which the RIS device 500 is applied to downlink communication from the gNB 200 to the UE 100A1 and the UE 100A2, the RIS device 500 can also be applied to uplink communication from the UE 100A1 and the UE 100A2 to the gNB 200.

The RIS device 500 illustrated in FIG. 4 is a reflective RIS device 500. Such an RIS device 500 reflects an incident radio wave to change the propagation direction of the radio wave. Here, a reflection angle of the radio wave can be variably configured. The RIS device 500 reflects radio waves incident from the gNB 200 toward each of the UE 100A1 and the UE 100A2. The RIS device 500 may reflect radio waves incident from each of the UE 100A1 and the UE 100A2 toward the gNB 200. The RIS device 500 dynamically changes the reflection angle of a radio wave. For example, in a communication resource between the gNB 200 and the UE 100A1, the RIS device 500 reflects a radio wave incident from the gNB 200 toward the UE 100A1 and/or reflects a radio wave incident from the UE 100A1 toward the gNB 200. Here, the communication resource includes a time direction resource and/or a frequency direction resource. In a communication resource between the gNB 200 and the UE 100A2, the RIS device 500 reflects a radio wave incident from the gNB 200 toward the UE 100A2 and/or reflects a radio wave incident from the UE 100A2 toward the gNB 200.

The RIS device 500 illustrated in FIG. 5 is a transmissive RIS device 500. Such an RIS device 500 refracts an incident radio wave to change the propagation direction of the radio wave. Here, a refraction angle of the radio wave can be variably configured. The RIS device 500 refracts radio waves incident from the gNB 200 toward each of the UE 100A1 and the UE 100A2. The RIS device 500 may refract radio waves incident from each of the UE 100A1 and the UE 100A2 toward the gNB 200. The RIS device 500 dynamically changes the refraction angle of a radio wave. For example, in a communication resource between the gNB 200 and the UE 100A1, the RIS device 500 refracts a radio wave incident from the gNB 200 toward the UE 100A1 and/or refracts a radio wave incident from the UE 100A1 toward the gNB 200. In a communication resource between the gNB 200 and the UE 100A2, the RIS device 500 refracts a radio wave incident from the gNB 200 toward the UE 100A2 and/or refracts a radio wave incident from the UE 100A2 toward the gNB 200.

As illustrated in FIG. 6, a single RIS device 500 may have both reflective and transmissive characteristics and be switchable between a reflective mode and a transmissive mode. For example, in a communication resource between the gNB 200 and the UE 100A1, the RIS device 500 reflects a radio wave incident from the gNB 200 toward the UE 100A1 and/or reflects a radio wave incident from the UE 100A1 toward the gNB 200. In a communication resource between the gNB 200 and the UE 100A2, the RIS device 500 refracts a radio wave incident from the gNB 200 toward the UE 100A2 and/or refracts a radio wave incident from the UE 100A2 toward the gNB 200.

As described above, efficient coverage extension can be achieved using the RIS device 500 by operating the RIS device 500 in coordination with the operation of the gNB 200. However, when the gNB 200 and the RIS device 500 are connected to each other by wiring to communicate with each other, a problem is that the installation cost of the RIS device 500 due to wiring work or the like increases and the degree of freedom 500 of installation of the RIS device 500 decreases.

Figure 7:
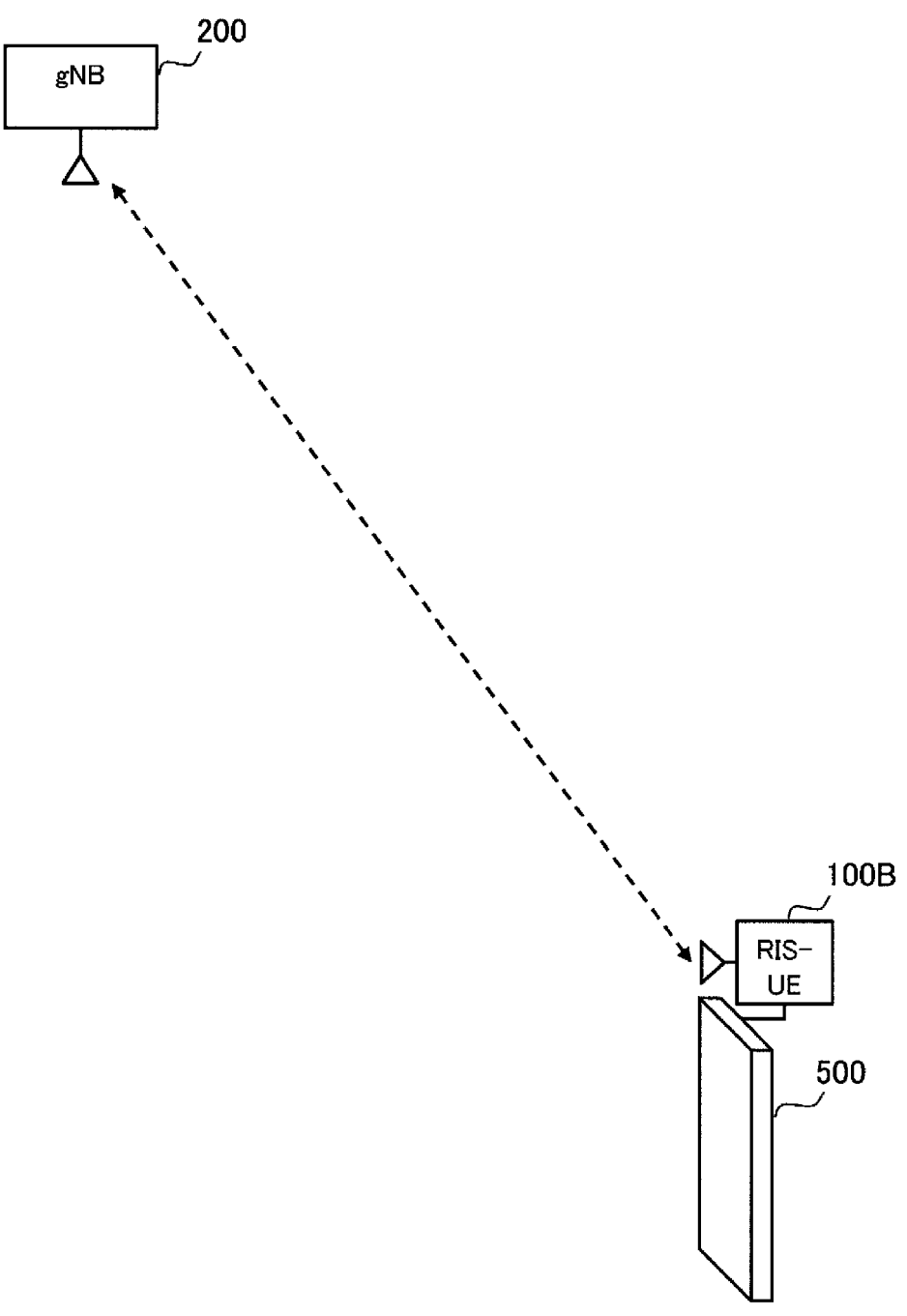
FIG. 7 is a diagram illustrating an application scenario for an RIS device according to an embodiment.

As illustrated in FIG. 7, a new UE (hereinafter referred to as "RIS-UE") for controlling the RIS device 500 is introduced. An RIS-UE 100B is an example of an RIS wireless terminal. The RIS-UE 100B controls the RIS device 500 in cooperation with the gNB 200 by establishing a wireless connection with the gNB 200 and performing wireless communication with the gNB 200. This can realize efficient coverage extension using the RIS device 500 while suppressing the increase in the installation cost and the decrease in the degree of freedom of the installation of the RIS device 500. The RIS-UE 100B controls the RIS device 500 in accordance with an RIS control configuration from the gNB 200. The RIS-UE 100B may autonomously control the RIS device 500 in accordance with a preconfigured RIS control configuration even if the RIS control configuration is not configured from the gNB 200. Note that the control configuration (for example, RIS control configuration) is also control information (for example, RIS control information).

The RIS-UE 100B may be configured separately from the RIS device 500. For example, the RIS-UE 100B may be located near the RIS device 500 and may be electrically connected to the RIS device 500. The RIS-UE 100B may be connected to the RIS device 500 by wire or wireless. The RIS-UE 100B may be configured integrally with the RIS device 500. The RIS-UE 100B and the RIS device 500 may be fixedly installed on a wall surface or a window, for example. The RIS-UE 100B and the RIS device 500 may be installed in, for example, a vehicle to be movable. One RIS-UE 100B may control a plurality of RIS devices 500.

Configurations of RIS-UE and RIS Device

Figure 8:
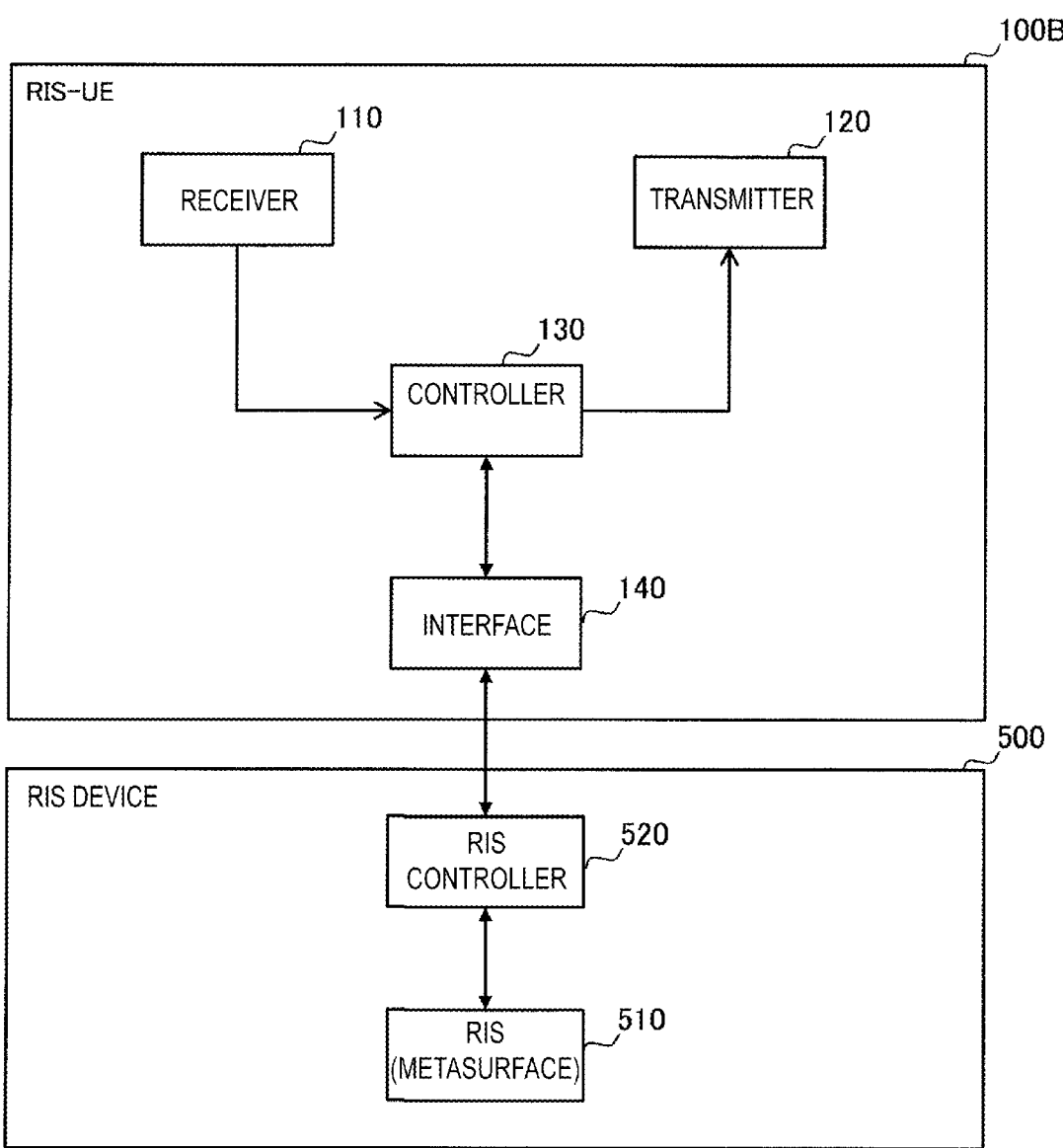
FIG. 8 is a diagram illustrating configurations of an RIS-UE (RIS wireless terminal) and the RIS device according to an embodiment.

Configurations of the RIS-UE 100B (RIS wireless terminal) and the RIS device 500 in an embodiment are described. FIG. 8 is a diagram illustrating the configurations of the RIS-UE 100B and the RIS device 500 according to an embodiment.

As illustrated in FIG. 8, the RIS-UE 100B includes a receiver 110, a transmitter 120, a controller 130, and an interface 140.

The receiver 110 performs various types of reception under control of the controller 130. The receiver 110 includes an antenna and a reception device. The reception device converts a radio wave received through the antenna (radio signal) into a baseband signal (a reception signal) and outputs the resulting signal to the controller 130. The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the RIS-UE 100B. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

The interface 140 is electrically connected to the RIS device 500. The controller 130 controls the RIS device 500 via the interface 140. Note that when the RIS-UE 100B and the RIS device 500 are integrally configured, the RIS-UE 100B may not include the interface 140.

The RIS device 500 includes an RIS 510 and an RIS controller 520. The RIS 510 is a metasurface configured using metamaterials. For example, the RIS 510 is configured by arranging very small structures in an array form with respect to a wavelength of a radio wave, in which a direction and beam shape of a reflected wave can be arbitrarily designed by forming the structures in different shapes depending on an arrangement location. The RIS 510 may be a transparent dynamic metasurface. The RIS 510 may be configured by stacking a transparent glass substrate on a metasurface substrate on which a large number of small structures are regularly arranged and which is made transparent, and may be capable of dynamically controlling three patterns of a mode of transmitting an incident radio wave, a mode of transmitting a part of a radio wave and reflecting a part thereof, and a mode of reflecting all radio waves by minutely moving the stacked glass substrate.

The RIS controller 520 controls the RIS 510 in response to a control signal from the controller 130 in the RIS-UE 100B. The RIS controller 520 may include at least one processor and at least one actuator. The processor interprets a control signal from the controller 130 in the RIS-UE 100B to drive the actuator in response to the control signal. Note that when the RIS-UE 100B and the RIS device 500 are integrally configured, the controller 130 in the RIS-UE 100B and the RIS controller 520 in the RIS device 500 may also be integrally configured.

In an embodiment, the receiver 110 in the RIS-UE 100B receives one or more RIS control configurations used to control the RIS device 500 from the gNB 200 through wireless communication. The controller 130 in the RIS-UE 100B controls the RIS device 500 based on the one or more RIS control configurations. The RIS control configuration is an example of downlink signaling from the gNB 200 to the RIS-UE 100B. This enables the gNB 200 to control the RIS device 500 via the RIS-UE 100B.

In an embodiment, the controller 130 in the RIS-UE 100B controls the RIS device 500. The controller 130 in the RIS-UE 100B acquires RIS device information indicating at least one of a capability of the RIS device 500 and a control state of the RIS device 500 from the RIS device 500 (RIS controller 520). The transmitter 120 in the RIS-UE 100B transmits the acquired RIS device information to the gNB 200 through wireless communication. The RIS device information is an example of uplink signaling from the RIS-UE 100B to the gNB 200. This enables the gNB 200 to grasp the capability and control state of the RIS device 500.

Configuration of Base Station

Figure 9:
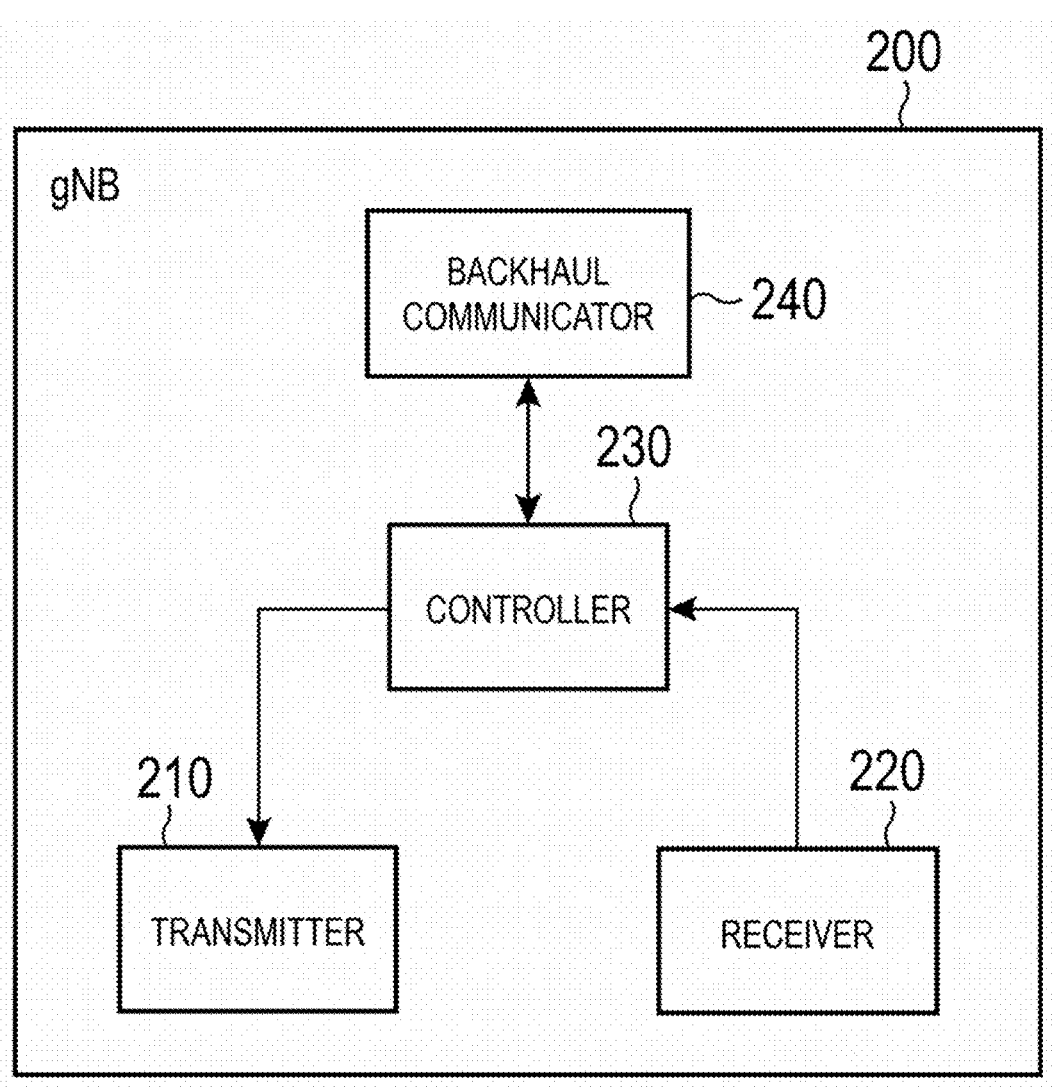
FIG. 9 is a diagram illustrating a configuration of a gNB (base station) according to an embodiment.

A configuration of the gNB 200 (base station) in an embodiment is described. FIG. 9 is a diagram illustrating the configuration of the gNB 200 according to an embodiment.

As illustrated in FIG. 9, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna. The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

In an embodiment, the transmitter 210 in the gNB 200 transmits one or more RIS control configurations used to control the RIS device 500 through wireless communication to the RIS-UE 100B controlling the RIS device 500. The RIS control configuration is an example of downlink signaling from the gNB 200 to the RIS-UE 100B. This enables the gNB 200 to control the RIS device 500 via the RIS-UE 100B.

In an embodiment, the receiver 220 in the gNB 200 receives the RIS device information indicating at least one of the capability of the RIS device 500 and the control state of the RIS device 500 through wireless communication from the RIS-UE 100B controlling the RIS device 500. The RIS device information is an example of uplink signaling from the RIS-UE 100B to the gNB 200. This enables the gNB 200 to grasp the capability and control state of the RIS device 500.

Operation of Mobile Communication System

Operations of the mobile communication system 1 in an embodiment are described.

(1) Downlink Signaling

Figure 10:
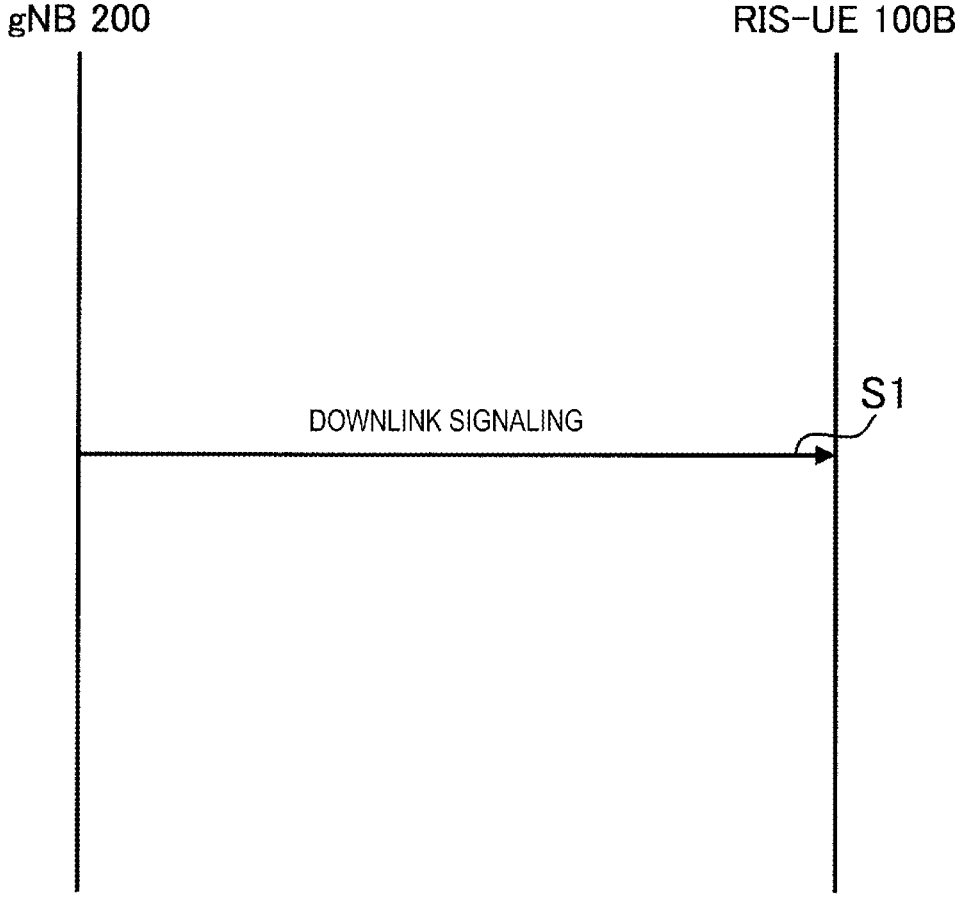
FIG. 10 is a diagram illustrating downlink signaling from the gNB to the RIS-UE according to an embodiment.

FIG. 10 is a diagram illustrating downlink signaling from the gNB 200 to the RIS-UE 100B according to an embodiment.

The gNB 200 (transmitter 210) transmits downlink signaling to the RIS-UE 100B. The downlink signaling may be an RRC message that is signaling of the RRC layer, a MAC Control Element (MAC CE) that is signaling of the MAC layer, or downlink control information (DCI) that is signaling of the PHY layer. The downlink signaling may be UE-specific signaling, or broadcast signaling. The downlink signaling may be a fronthaul message (for example, F1-AP message).

For example, as illustrated in FIG. 10, the gNB 200 (transmitter 210) transmits the downlink signaling including the RIS control configuration used to control the RIS device 500 to the RIS-UE 100B that has established a wireless connection with the gNB 200 (step S1). The gNB 200 (transmitter 210) may include the RIS control configuration in an RRC Reconfiguration message that is a type of a UE-specific RRC message to transmit to the RIS-UE 100B. The downlink signaling may be a message of a layer (for example, an RIS application) higher than the RRC layer. The downlink signaling may be transmitting a message of a layer higher than the RRC layer encapsulated with a message of a layer equal to or lower than the RRC layer.

Note that the RIS-UE 100B (transmitter 120) may transmit a response message with respect to the downlink signaling from the gNB 200 in the uplink. The response message may be transmitted in response to the RIS device 500 completing the configuration designated by the downlink signaling or receiving the configuration.

As illustrated in FIG. 11, the RIS control configuration may include frequency configuration information to configure a center frequency of a radio wave (for example, a component carrier) targeted by the RIS device 500. When the RIS control configuration received from the gNB 200 includes the frequency configuration information, the RIS-UE 100B (controller 130) controls the RIS device 500 such that the RIS device 500 operates targeting (for example, reflects, transmits (refracts), or blocks) the radio wave at the center frequency indicated by the frequency configuration information. The RIS control configuration may include a plurality of pieces of frequency configuration information to configure center frequencies to be different from each other. Since the RIS control configuration includes the frequency configuration information, the gNB 200 can designate the center frequency of the radio wave to be targeted by the RIS device 500 via the RIS-UE 100B.

The RIS control configuration may include mode configuration information to configure an operation mode of the RIS device 500. The mode configuration information may be associated with the frequency configuration information (center frequency). The operation mode may be any one of a reflective mode in which the radio wave is reflected, a refractive mode in which the radio wave is refracted, a transmissive mode in which the radio wave is transmitted, and a blocking mode in which the radio wave is blocked. When the RIS control configuration received from the gNB 200 includes the mode configuration information, the RIS-UE 100B (controller 130) controls the RIS device 500 such that the RIS device 500 operates in the operation mode indicated by the mode configuration information. Since the RIS control configuration includes the mode configuration information, the gNB 200 can designate the operation mode of the RIS device 500 via the RIS-UE 100B.

The RIS control configuration may include direction configuration information to configure the propagation direction of the radio wave changed by the RIS device 500. The direction configuration information may be associated with the frequency configuration information (center frequency). The direction configuration information may be information to configure a reflection angle in the RIS device 500 or may be information to configure a refraction angle in the RIS device 500. Since the RIS control configuration includes the direction configuration information, the gNB 200 can designate the propagation direction of the radio wave changed by the RIS device 500 via the RIS-UE 100B.

As illustrated in FIG. 12, when the RIS-UE 100B controls a plurality of RIS devices 500, the gNB 200 (transmitter 210) may transmit the RIS control configuration for each RIS device 500 to the RIS-UE 100B. In this case, the RIS control configuration may include an identifier of the corresponding RIS device 500 (RIS device identifier). The RIS-UE 100B (controller 130) controlling the plurality of RIS devices 500 determines the RIS device 500 to which the RIS control configuration is applied, based on the RIS device identifier included in the RIS control configuration received from the gNB 200. Note that the RIS device identifier may be transmitted together with the RIS control configuration from the RIS-UE 100B to the gNB 200 even when the RIS-UE 100B controls only one RIS device 500.

As described above, the RIS-UE 100B (controller 130) controls the RIS device 500 based on the RIS control configuration from the gNB 200. This enables the gNB 200 to control the RIS device 500 via the RIS-UE 100B.

(2) Uplink Signaling

Figure 13:
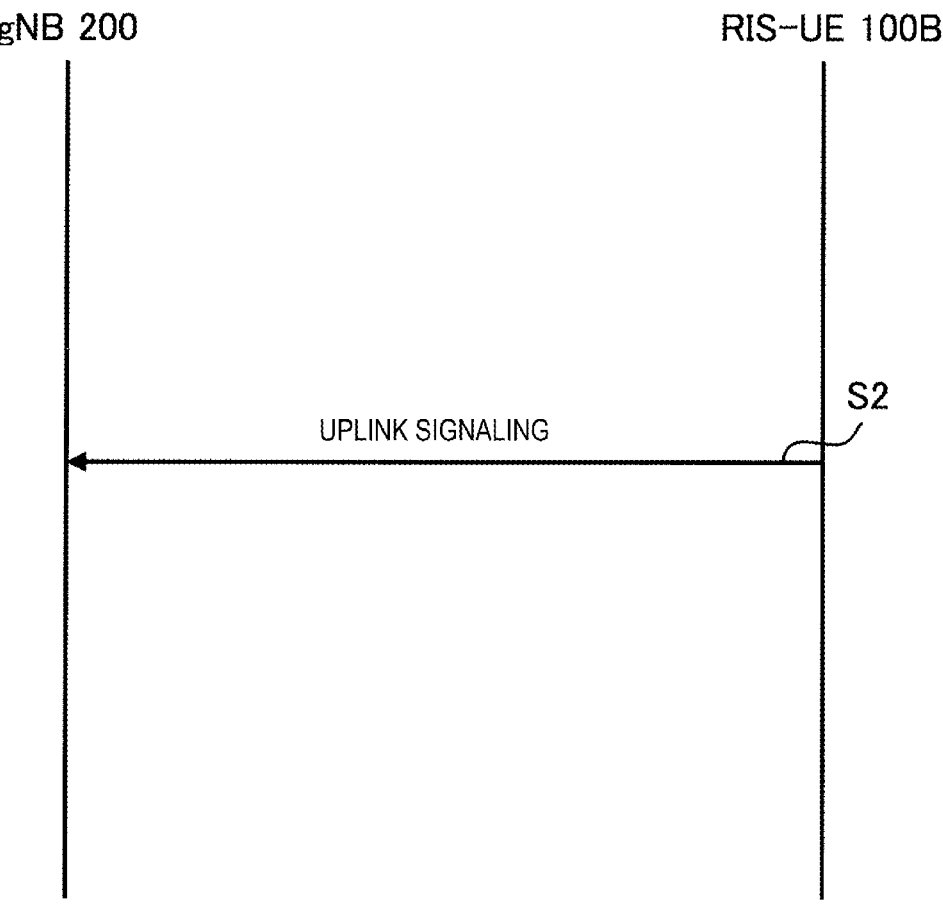
FIG. 13 is a diagram illustrating uplink signaling from the RIS-UE to the gNB according to an embodiment.

FIG. 13 is a diagram illustrating uplink signaling from the RIS-UE 100B to the gNB 200 according to an embodiment.

The RIS-UE 100B (transmitter 210) transmits uplink signaling to the gNB 200. The uplink signaling may be an RRC message that is signaling of the RRC layer, a MAC CE that is signaling of the MAC layer, or uplink control information (UCI) that is signaling of the PHY layer. The uplink signaling may be a fronthaul message (for example, F1-AP message). The uplink signaling may be a message of a layer (for example, an RIS application) higher than the RRC layer. The uplink signaling may be transmitting a message of a layer higher than the RRC layer encapsulated with a message of a layer equal to or lower than the RRC layer. Note that the gNB 200 (transmitter 210) may transmit a response message with respect to the uplink signaling from the RIS-UE 100B in the downlink, and the RIS-UE 100B (receiver 110) may receive the response message.

For example, the RIS-UE 100B (transmitter 120) that has established a wireless connection with the gNB 200 transmits the RIS device information indicating at least one of the capability of the RIS device 500 and the control state of the RIS device 500 to the gNB 200 through wireless communication (step S2). Specifically, the RIS device information includes RIS device capability information indicating at least one of the capability of the RIS device 500 and control state information indicating the control state of the RIS device 500. The RIS-UE 100B (transmitter 120) may include the RIS device information in a UE Capability message or a UE Assistant Information message that is a type of the RRC message to transmit to the gNB 200. The RIS-UE 100B (transmitter 120) may transmit the RIS device information (RIS device capability information and/or control state information) to the gNB 200 in response to a request or inquiry from the gNB 200. The RIS-UE 100B (transmitter 120) may periodically transmit the RIS device information (particularly, control state information) to the gNB 200 in response to the configuration from the gNB 200. The transmission period may be configured in the RIS-UE 100B from the gNB 200.

Figure 14:
FIG. 14 is a diagram illustrating a configuration of RIS device capability information according to an embodiment.

As illustrated in FIG. 14, the RIS device capability information may include supported frequency information indicating a frequency supported by the RIS device 500. The supported frequency information may be a numerical value or index indicating a range of the frequencies supported by the RIS device 500. When the RIS device capability information received from the RIS-UE 100B includes the supported frequency information, the gNB 200 (controller 230) can grasp the frequency supported by the RIS device 500, based on the supported frequency information. The gNB 200 (controller 230) may configure the center frequency of the radio wave targeted by the RIS device 500 within the range of the frequencies supported by the RIS device 500.

The RIS device capability information may include mode capability information regarding operation modes or switching between the operation modes that can be supported by the RIS device 500. The operation mode may be least any one selected from the group consisting of a reflective mode in which the radio wave is reflected, a refractive mode in which the radio wave is refracted, a transmissive mode in which the radio wave is transmitted, and a blocking mode in which the radio wave is blocked. The mode capability information may be information indicating which operation mode among these operation modes the RIS device 500 can support. The mode capability information may be information indicating between which operation modes among these operation modes the mode switching is possible. When the RIS device capability information received from the RIS-UE 100B includes the mode capability information, the gNB 200 (controller 230) can grasp the operation modes and mode switching supported by the RIS device 500, based on the mode capability information. The gNB 200 (controller 230) may configure the operation mode of the RIS device 500 within a range of the grasped operation modes and mode switching.

The RIS device capability information may include angle capability information regarding an angular change in the propagation direction that can be supported by the RIS device 500. The angle capability information may be, for example, information indicating a variable range of a reflection angle or a refraction angle with respect to the horizontal direction or the vertical direction (for example, control of 30° to 90° is possible in the refraction) or information indicating an absolute angle. The angle capability information may be information indicating an angular change for each variable step (for example, horizontal 5°/step, vertical 10°/step) or may be information indicating the number of variable steps (for example, horizontal 10 steps, vertical 20 steps). When the RIS device capability information received from the RIS-UE 100B includes the angle capability information, the gNB 200 (controller 230) can grasp the angular change that can be supported by the RIS device 500, based on the angle capability information. The gNB 200 (controller 230) may configure the propagation direction of the radio wave changed by the RIS device 500 within a range of the grasped angular change.

The RIS device capability information may include control delay information indicating a control delay time in the RIS device 500. For example, the control delay information is information indicating a delay time (for example, 1 ms, 10 ms . . . ) from a timing at which the UE 100 receives the RIS control configuration or a timing at which configuration completion for the RIS control configuration is transmitted to the gNB 200 until control (change of the operation mode or change of the reflection angle or the refraction angle) according to the RIS control configuration is completed. When the RIS device capability information received from the RIS-UE 100B includes the control delay information, the gNB 200 (controller 230) can grasp the control delay time in the RIS device 500, based on the control delay information.

The RIS device capability information may include attenuation characteristic information indicating radio wave attenuation characteristics in the RIS device 500. The attenuation characteristic information includes at least one of information indicating transmission attenuation in dB (decibel) and information indicating reflection attenuation in dB (decibel). When the RIS device capability information received from the RIS-UE 100B includes the attenuation characteristic information, the gNB 200 (controller 230) can grasp the radio wave attenuation characteristics in the RIS device 500 based on the attenuation characteristic information. The RIS device capability information may include information indicating an installation location of the RIS 510. The information indicating the installation location may include any one or more of latitude, longitude, and altitude. The information indicating the installation location may include information indicating a distance from the gNB 200 and/or an installation angle of the RIS 510. The installation angle may be a relative angle with respect to the gNB 200, or a relative angle with respect to, for example, north, vertical, or horizontal.

As illustrated in FIG. 15, when the RIS-UE 100B controls a plurality of RIS devices 500, the RIS-UE 100B (transmitter 120) may transmit the RIS device capability information for each RIS device 500 to the gNB 200. In this case, the RIS device capability information may include an identifier of the corresponding RIS device 500 (RIS device identifier). When the RIS-UE 100B controls the plurality of RIS devices 500, the RIS-UE 100B (transmitter 120) may transmit information indicating at least one of the identifier of each of the plurality of RIS devices 500 and the number of the plurality of RIS devices 500. Note that the RIS device identifier may be transmitted together with the RIS device capability information from the RIS-UE 100B to the gNB 200 even when the RIS-UE 100B controls only one RIS device 500.

As illustrated in FIG. 16, the control state information may include frequency state information indicating a center frequency of a radio wave targeted by the RIS device 500. The frequency state information may be information indicating the latest (current) center frequency of the radio wave targeted by the RIS device 500 at a transmission time point of the control state information. When the control state information received from the RIS-UE 100B includes the frequency state information, the gNB 200 (controller 230) can grasp the center frequency of the radio wave targeted by the RIS device 500 based on the frequency state information.

The control state information may include mode state information indicating an operation mode of the RIS device 500. The mode state information may be information indicating the latest (current) operation mode of the RIS device 500 at the transmission time point of the control state information. The operation mode may be any one of a reflective mode in which the radio wave is reflected, a refractive mode in which the radio wave is refracted, a transmissive mode in which the radio wave is transmitted, and a blocking mode in which the radio wave is blocked. When the control state information received from the RIS-UE 100B includes the mode state information, the gNB 200 (controller 230) can grasp the operation mode of the RIS device 500, based on the mode state information.

The control state information may include direction state information indicating a propagation direction of a radio wave changed by the RIS device 500. The direction state information may be information indicating a reflection angle or a refraction angle of the radio wave in the RIS device 500. The direction state information may be information indicating the latest (current) propagation direction of the radio wave of the RIS device 500 at the transmission time point of the control state information. When the control state information received from the RIS-UE 100B includes the direction state information, the gNB 200 (controller 230) can grasp the propagation direction of the radio wave changed by the RIS device 500, based on the direction state information.

Figure 17:
FIG. 17 is a diagram illustrating a configuration of control state information according to an embodiment.

As illustrated in FIG. 17, when the RIS-UE 100B controls a plurality of RIS devices 500, the RIS-UE 100B (transmitter 120) may transmit the control state information for each RIS device 500 to the gNB 200. In this case, the control state information may include an identifier of the corresponding RIS device 500 (RIS device identifier). Note that the RIS device identifier may be transmitted together with the control state information from the RIS-UE 100B to the gNB 200 even when the RIS-UE 100B controls only one RIS device 500.

As described above, the RIS-UE 100B (controller 130) controls the RIS device 500 based on the RIS control configuration from the gNB 200. This enables the gNB 200 to control the RIS device 500 via the RIS-UE 100B.

As described above, the RIS-UE 100B (transmitter 120) transmits the RIS device information indicating at least one of the capability of the RIS device 500 and the control state of the RIS device 500 to the gNB 200 through wireless communication. This enables the gNB 200 to grasp the capability and control state of the RIS device 500.

(3) Operation Related to Measurement by RIS-UE

Figure 18:
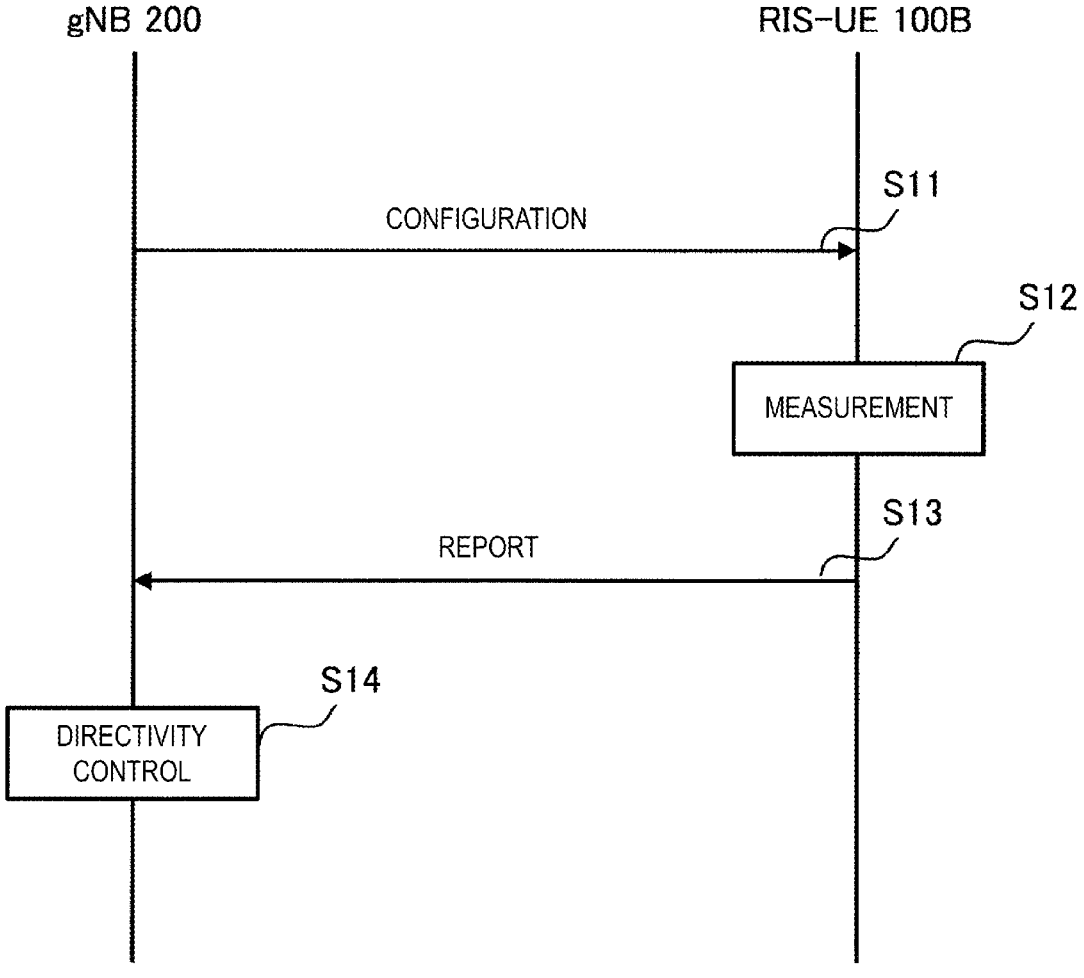
FIG. 18 is a diagram illustrating operations related to measurement by the RIS-UE according to an embodiment.

FIG. 18 is a diagram illustrating operations related to measurement by the RIS-UE 100B according to an embodiment. The RIS-UE 100B measures a radio state. Here, it is assumed that the RIS-UE 100B is integrated with the RIS device 500 or located in the vicinity of the RIS device 500. Therefore, a radio state in the RIS-UE 100B can be treated as the same as a radio state in the RIS device 500.

As illustrated in FIG. 18, in step S11, the gNB 200 (transmitter 210) transmits a configuration related to measurement (measurement configuration) to the RIS-UE 100B that has established a wireless connection with the gNB 200. In the measurement configuration, a measurement and a report of a measurement result for at least one of a radio wave incident on the RIS device 500 from the gNB 200 and a radio wave incident on the RIS device 500 from the UE 100 (for example, the UE 100A described above) are configured in the RIS-UE 100B. The measurement configuration may include information to configure at least one selected from the group consisting of a measurement target frequency, a measurement target signal (for example, a DM-RS or a CSI-RS that is a downlink reference signal, and/or an SRS that is an uplink reference signal), a measurement target resource (for example, a subframe, a resource element, and/or a signal sequence), and a report type. The report type may be periodic report or event-triggered report.

In step S12, the RIS-UE 100B (controller 130) performs measurement of the radio state (radio measurement) based on the measurement configuration received from the gNB 200 in step S11. The RIS device 500 (controller 130) performs radio measurement on a radio wave incident on the RIS device 500 from the gNB 200 (in other words, downlink measurement). The RIS device 500 (controller 130) may perform radio measurement on a radio wave incident on the RIS device 500 from the UE 100 (in other words, uplink measurement).

The measurement by the RIS-UE 100B may be a radio resource management (RRM) measurement mainly performed in the RRC layer, or a channel state information (CSI) measurement mainly performed in the PHY layer. The measurement result obtained by the RRM measurement may be, for example, at least one selected from the group consisting of a reference signal received power (RSRP), a reference signal received quality (RSRQ), and a received signal strength indicator (RSSI). The measurement result obtained by the CSI measurement may be, for example, at least one selected from the group consisting of a Channel Quality Indicator (CQI), a Precoding Matrix Indicator (PMI), a CSI-RS Resource Indicator (CRI), a Strongest layer Indicator (SLI), a Rank Indicator (RI), and an L1-RSRP.

In step S13, the RIS-UE 100B (transmitter 120) transmits a report including the measurement result obtained in step S12 to the gNB 200. The measurement result is at least one of the RRM measurement result and the CSI measurement result.

In step S14, the gNB 200 (controller 230) controls transmission of a radio wave (for example, transmission directivity of a beam), based on the report of the measurement result received from the RIS-UE 100B in step S13. For example, the gNB 200 (controller 230) controls the transmission directivity so that a beam is directed to the RIS device 500. The gNB 200 (controller 230) may reconfigure the RIS device 500 via an RIS-UE 100B.

As described above, the gNB 200 (controller 230) treats the radio state in the RIS-UE 100B as the same as the radio state in the RIS device 500, and thus can perform appropriate beam forming using the measurement result by the RIS-UE 100B.

EXAMPLES

Given the embodiment described above, first to fifth examples are described. These examples can not only be separately and independently implemented, but can also be implemented in combination of two or more thereof. In an operation flow of each example described below, all the steps may not be necessarily performed, and only a part of the steps may be performed.

(1) First Example

Figure 19:
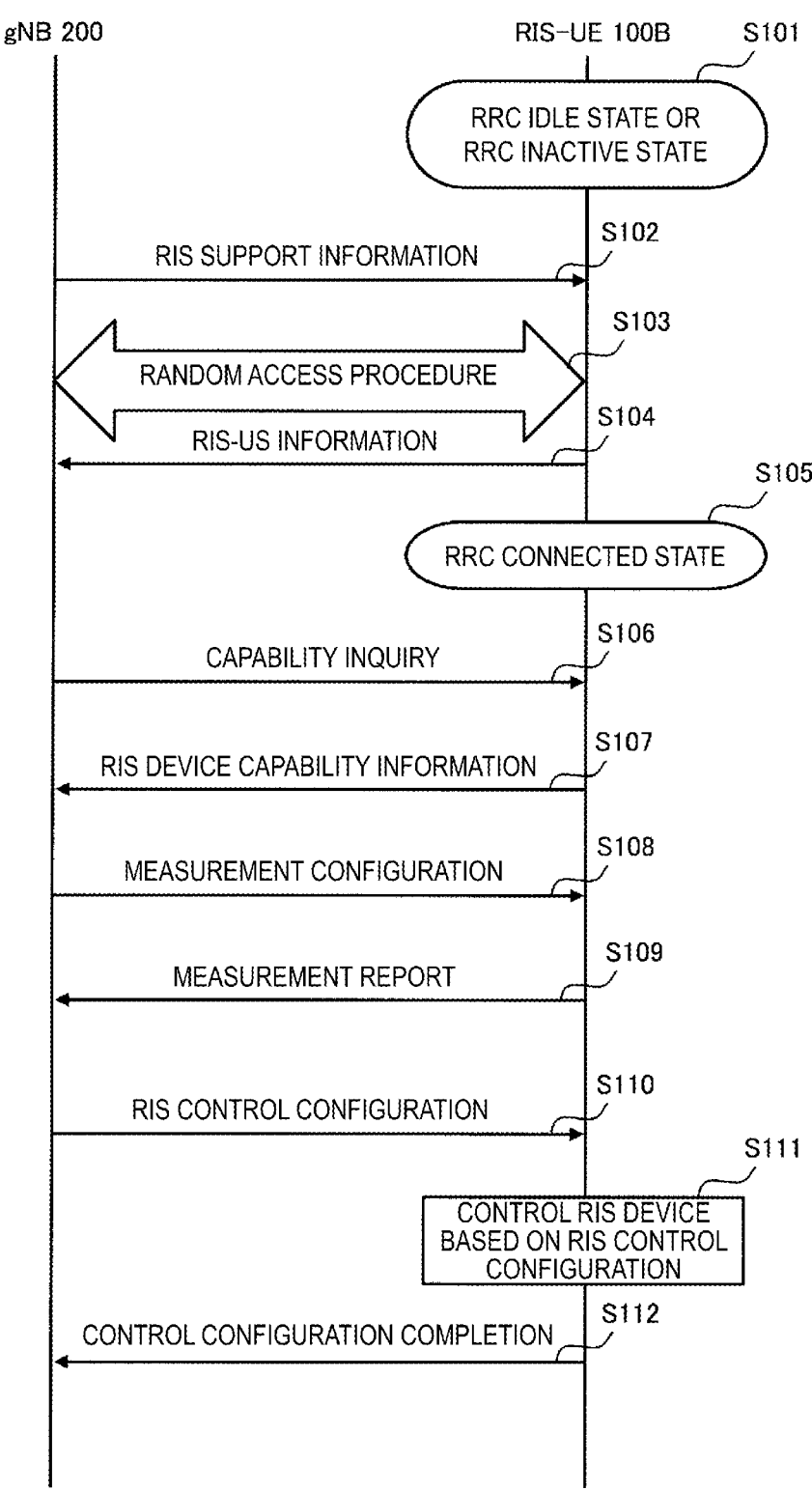
FIG. 19 is a diagram illustrating operations according to a first example.

FIG. 19 is a diagram illustrating operations according to a first example.

As illustrated in FIG. 19, in step S101 the RIS-UE 100B is in an RRC idle state or an RRC inactive state.

In step S102, the gNB 200 (transmitter 210) broadcasts RIS support information indicating that the gNB 200 supports the RIS-UE 100B. For example, the gNB 200 (transmitter 210) broadcasts a system information block (SIB) including the RIS support information. The gNB 200 (transmitter 210) may broadcast RIS non-support information indicating that the gNB 200 does not support the RIS-UE 100B.

The RIS-UE 100B (controller 130) that has not established a wireless connection with the gNB 200 may determine that an access to the gNB 200 is permitted in response to receiving the RIS support information from the gNB 200, and may perform an access operation to establish a wireless connection with the gNB 200. The RIS-UE 100B (controller 130) may regard the gNB 200 (cell) to which an access is permitted as the highest priority and perform cell reselection.

On the other hand, when the gNB 200 does not broadcast the RIS support information (or when the gNB 200 broadcasts the RIS non-support information), the RIS-UE 100B (controller 130) that has not established a wireless connection with the gNB 200 may determine that an access (connection establishment) to the gNB 200 is not possible. This allows the RIS-UE 100B to establish a wireless connection only with the gNB 200 capable of handling the RIS-UE 100B.

Note that when the gNB 200 is congested, the gNB 200 may broadcast access restriction information to restrict an access from the UE 100. However, unlike a normal UE 100, the RIS-UE 100B can be regarded as a network-side entity. Therefore, the RIS-UE 100B may ignore the access restriction information from the gNB 200. For example, the RIS-UE 100B (controller 130), when receiving the RIS support information from the gNB 200, may perform an operation to establish a wireless connection with the gNB 200 even if the gNB 200 broadcasts the access restriction information. For example, the RIS-UE 100B (controller 130) may not perform (or may ignore) Unified Access Control (UAC). Alternatively, any one or both of Access Category/Access Identity (AC/AI) used in the UAC may be a special value indicating that the access is made by the RIS-UE.

In step S103, the RIS-UE 100B (controller 130) starts a random access procedure for the gNB 200. In the random access procedure, the RIS-UE 100B (transmitter 120) transmits a random access preamble (Msg 1) and an RRC message (Msg 3) to the gNB 200. In the random access procedure, the RIS-UE 100B (receiver 110) receives a random access response (Msg 2) and an RRC message (Msg 4) from the gNB 200.

In step S104, the RIS-UE 100B (transmitter 120), when establishing a wireless connection with the gNB 200, may transmit RIS-UE information indicating that the RIS-UE 100B itself is an RIS-UE to the gNB 200. For example, the RIS-UE 100B (transmitter 120), during the random access procedure with the gNB 200, includes the RIS-UE information in the message (for example, Msg 1, Msg 3, Msg 5) for the random access procedure to transmit to the gNB 200. The gNB 200 (controller 230) can recognize that the accessing UE 100 is the RIS-UE 100B, based on the RIS-UE information received from the RIS-UE 100B, and exclude from the access restriction target (in other words, accept the access from), for example, the RIS-UE 100B.

In step S105, the RIS-UE 100B transitions from RRC idle state or the RRC inactive state to the RRC connected state.

In step S106, the gNB 200 (transmitter 120) transmits a capability inquiry message to inquire the capability of the RIS-UE 100B to the RIS-UE 100B. The RIS-UE 100B (receiver 110) receives the capability inquiry message.

In step S107, the RIS-UE 100B (transmitter 120) transmits a capability information message including the RIS device capability information described above to the gNB 200. The gNB 200 (receiver 220) receives the capability information message. The gNB 200 (controller 230) grasps the capability of the RIS device 500 based on the received capability information message.

In step S108, the gNB 200 (transmitter 210) transmits, to the RIS-UE 100B, an RRC message including measurement configuration information to configure measurement by the RIS-UE 100B (measurement configuration message). The RIS-UE 100B (receiver 110) receives the measurement configuration message. The RIS-UE 100B (controller 130) performs radio measurement based on the measurement configuration message.

In step S109, the RIS-UE 100B (transmitter 120) transmits a report including a radio measurement result (measurement report) to the gNB 200. The gNB 200 (controller 230) may perform beam forming so that a beam is directed to the RIS-UE 100B (RIS device 500), based on the measurement report received from the RIS-UE 100B. The gNB 200 (controller 230) may determine the RIS control configuration to be configured in the RIS-UE 100B, based on the measurement report received from the RIS-UE 100B.

In step S110, the gNB 200 (transmitter 120) transmits the RIS control configuration used to control the RIS device 500 to the RIS-UE 100B. The gNB 200 (transmitter 120) may transmit an RRC Reconfiguration message including the RIS control configuration to the RIS-UE 100B. The RIS-UE 100B (receiver 110) receives the RIS control configuration.

In step S111, the RIS-UE 100B (controller 130) controls the RIS device 500, based on the RIS control configuration received from the gNB 200. The RIS-UE 100B (controller 130) may control the RIS device 500 by notifying the RIS device 500 (RIS controller 520) of the RIS control configuration received from the gNB 200.

In step S112, the RIS-UE 100B (transmitter 120) transmits a control configuration completion message (for example, an RRC Reconfiguration Complete message) to the gNB 200 upon completion of controlling (configuration change) the RIS device 500. Here, the RIS-UE 100B (controller 130) may determine the control completion, based on a notification (feedback) from the RIS device 500 (RIS controller 520). The gNB 200 (receiver 220) receives the control configuration completion message.

(2) Second Example

Figure 20:
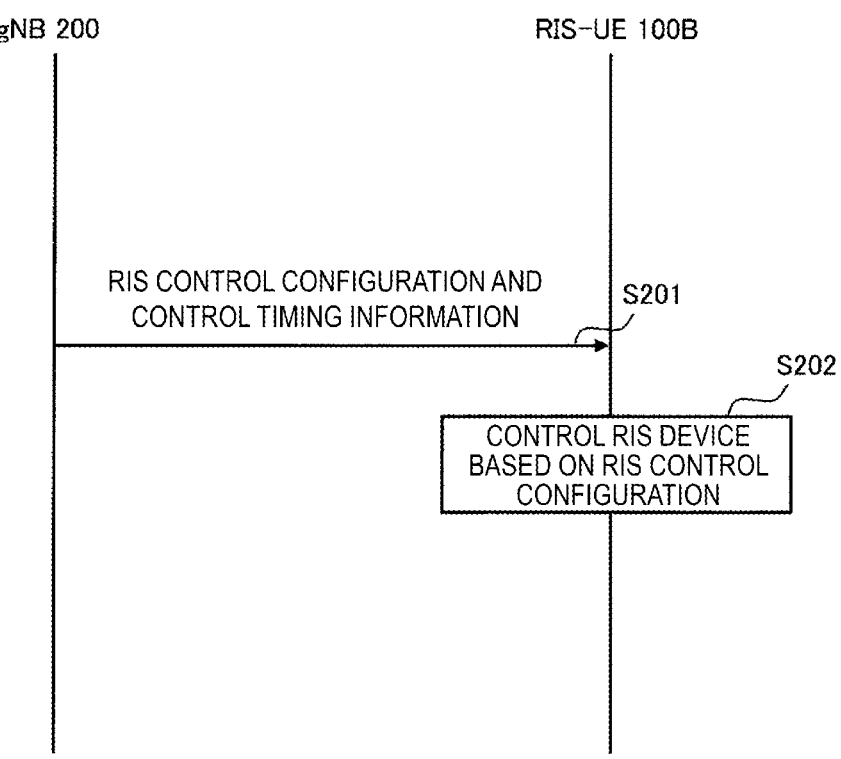
FIG. 20 is a diagram illustrating operations according to a second example.

In the embodiment and the first example described above, the case that the RIS device 500 is semi-statically controlled is mainly assumed. In a second example, a case is assumed that the RIS device 500 can be dynamically controlled. FIG. 20 is a diagram illustrating operations according to the second example.

As illustrated in FIG. 20, in step S201, the gNB 200 (transmitter 120) transmits, to the RIS-UE 100B, one or more RIS control configurations and control timing information indicating a timing at which each of the one or more RIS control configurations are applied.

For example, the gNB 200 (transmitter 120) transmits an RRC message including the RIS control configuration and the control timing information (for example, an RRC Reconfiguration message) to the RIS-UE 100B. The RIS-UE 100B (receiver 110) receives the RIS control configuration and the control timing information. Note that step S201 corresponds to step S110 in the first example described above.

In step S202, the RIS-UE 100B (controller 130) controls the RIS device 500, based on the RIS control configuration and the control timing information received in step S201. To be more specific, the RIS-UE 100B (controller 130) controls the RIS device 500 in accordance with the RIS control configuration associated with the control timing information at the timing indicated by the control timing information.

Figure 21:
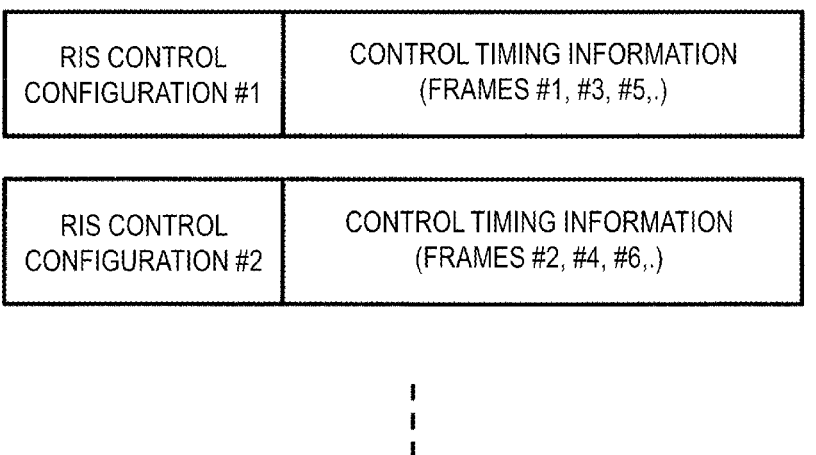
FIG. 21 is a diagram illustrating a configuration example of an RIS control configuration and control timing information according to the second example.

FIG. 21 is a diagram illustrating a configuration example of the RIS control configuration and the control timing information according to the second example.

As illustrated in FIG. 21, RIS control configuration #1 and RIS control configuration #2 are associated with respective pieces of control timing information different from each other. For example, the control timing information associated with RIS control configuration #1 indicates that RIS control configuration #1 is applied to frame numbers #1, #3, #5 . . . . The control timing information associated with RIS control configuration #2 indicates that RIS control configuration #2 is applied to frame numbers #2, #4, #6 . . . . Note that the RIS-UE 100B (controller 130) can grasp the current frame number, based on the frame number broadcast by the gNB 200 (for example, the frame number in the master information block).

Here, the frame number may be a hyper system frame number (H-SFN), a system frame number (SFN), or a subframe number. The control timing information may include a slot number and/or an OFDM symbol number instead of or in addition to the frame number, or may include an absolute time (for example, a GPS time). As described above, the plurality of RIS control configurations are applied to the control of the RIS device 500 at different timings. The control timing information includes information indicating an application timing of each of the plurality of RIS control configurations.

FIG. 21 illustrates an example in which the application timing of the RIS control configuration is designated by a frame number or the like. However, the control timing information may be configured in a bitmap format including bits each associated with a frame number. For example, the RIS-UE 100B (controller 130) applies the RIS control configuration to the frame number corresponding to "1" in the bitmap, and does not apply the RIS control configuration to a radio frame corresponding to 0. The control timing information may further include a start frame number to which the bitmap is applied.

According to the second example, the RIS device 500 can be dynamically controlled by transmitting from the gNB 200 to the RIS-UE 100B, the control timing information indicating the timing at which the RIS control configuration is applied.

(3) Third Example

Figure 22:
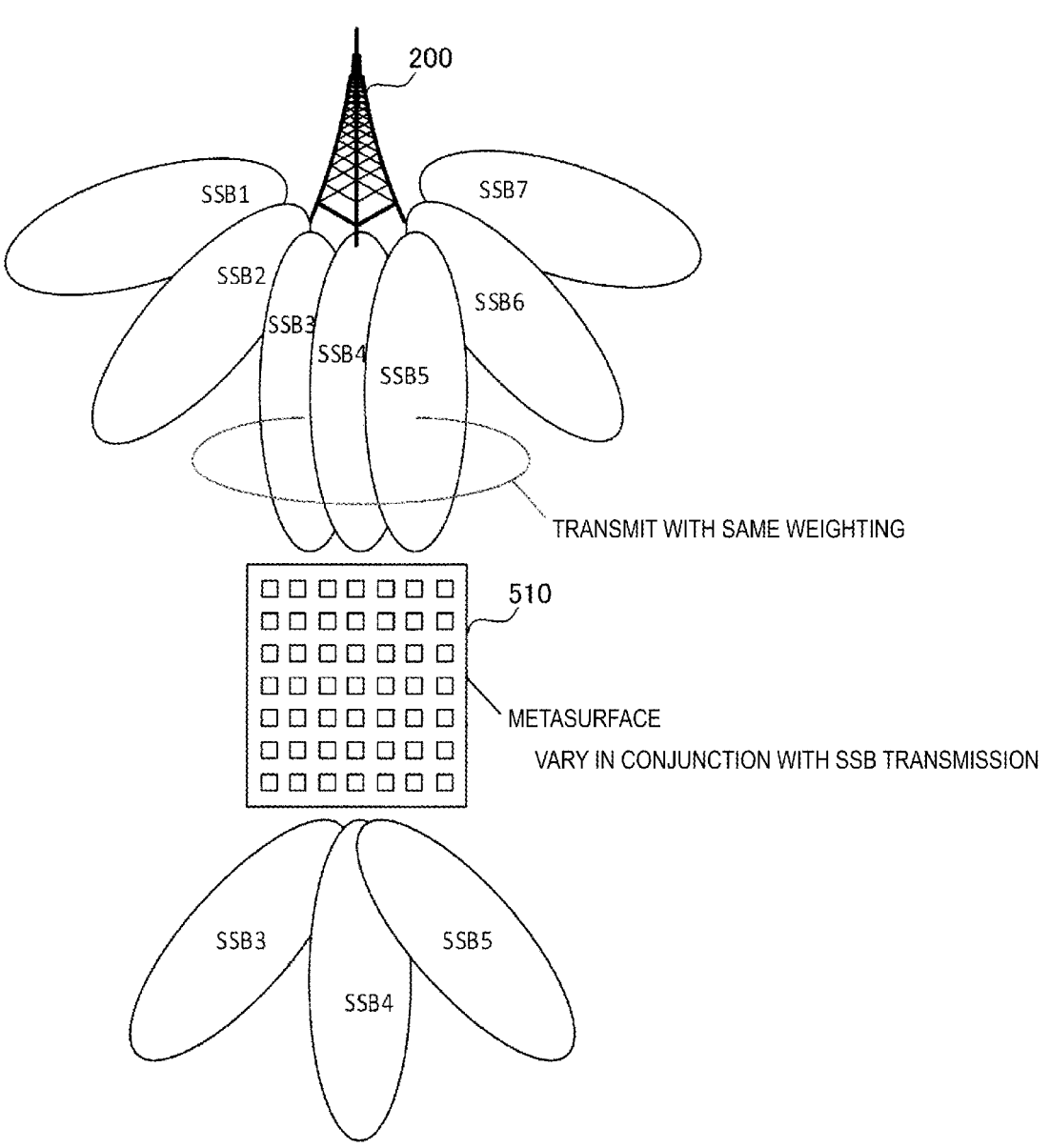
FIG. 22 is a diagram illustrating operations according to a third example.

In a third example, an example in which synchronization signal block (SS/PBCH Block: SSB) transmission is coordinated with the control of the RIS device 500 is described. The SSB includes a primary synchronization signal (PSS), a secondary synchronization signal (SSS), a Physical Broadcast Channel (PBCH), and a demodulation reference signal (DMRS). For example, the SSB may include four OFDM symbols that are consecutive in the time domain. The SSB may include 240 subcarriers (20 resource blocks) that are consecutive in the frequency domain. Note that the PBCH is a physical channel that carries a master information block (MIB). FIG. 22 is a diagram illustrating operations according to the third example.

In the SSB transmission, the gNB 200 performs beam sweeping by changing weighting (directivity) for each SSB. When the RIS device 500, to be more specific, the RIS (metasurface) 510 is interposed in the propagation path between the gNB 200 and UE 100, the communication quality changes under the control of the RIS device 500. Therefore, the beam sweeping in coordination with the control of the RIS device 500 makes it possible to optimize the SSB transmission in which the RIS device 500 is interposed.

As illustrated in FIG. 22, the gNB 200 (transmitter 210) transmits a plurality of SSBs at timings different from each other and with beams different from each other. FIG. 22 illustrates an example in which the gNB 200 (transmitter 210) transmits a total of seven SSBs from an SSB 1 to an SSB 7. Here, the gNB 200 (transmitter 210) transmits a configuration of the SSB 3 to the SSB 5 (hereinafter referred to as "SSB set") with the same weighting (in other words, the same beam characteristics). Although an example is illustrated in which the number of SSBs constituting the SSB set is three, the number of SSBs constituting the SSB set may be two, or four or more.

The gNB 200 (transmitter 210) may transmit information on each SSB included in the SSB set (for example, information of an identifier and/or a transmission timing of the SSB) to the RIS-UE 100B by way of an RRC message, for example. The gNB 200 (transmitter 210) may transmit the RIS control configuration in association with the information related to each SSB included in the SSB set to the RIS-UE 100B. In other words, the gNB 200 (transmitter 210) may transmit the RIS control configuration for each SSB included in the SSB set to the RIS-UE 100B. The gNB 200 (transmitter 210) may designate a different application timing for each RIS control configuration using the control timing information described above. The control timing information for SSB may include information elements the same as or different from those of the control timing information described above.

The RIS-UE 100B applies a different RIS control configuration for each SSB included in the SSB set to control the RIS device 500, to be more specific, the RIS (metasurface) 510. FIG. 22 illustrates an example in which an SSB 3 included in the SSB set is reflected or refracted at a certain angle, an SSB 4 included in the SSB set is transmitted, and an SSB 5 included in the SSB set is reflected or refracted at a certain angle. Here, the propagation direction (reflection angle or refraction angle) of each SSB changed by the RIS device 500 is coordinated with an original propagation direction of each SSB transmitted by the gNB 200.

As described above, in the third example, the gNB 200 transmits a plurality of SSBs (SSB sets) with transmission timings different from each other toward the RIS device 500. The RIS control configurations are associated with the plurality of SSBs. To be more specific, the gNB 200 transmits the plurality of SSBs with the same beam characteristics toward the RIS device 500. The RIS-UE 100B controls the propagation direction of each of the plurality of SSBs based on the RIS control configurations. This can make the propagation direction (reflection angle or refraction angle) different for each SSB included in the SSB set.

In the example described in the third example, the RIS-UE 100B controls the RIS device 500 in accordance with the RIS control configuration from the gNB 200. However, the RIS-UE 100B may autonomously control the RIS device 500 in accordance with a preconfigured RIS control configuration even if the RIS control configuration is not configured from the gNB 200. In this case, the RIS-UE 100B may notify the gNB 200 of the preconfigured RIS control configuration as the control state information descried above. Details of such an operation are described in a fourth example below.

(4) Fourth Example

Figure 23:
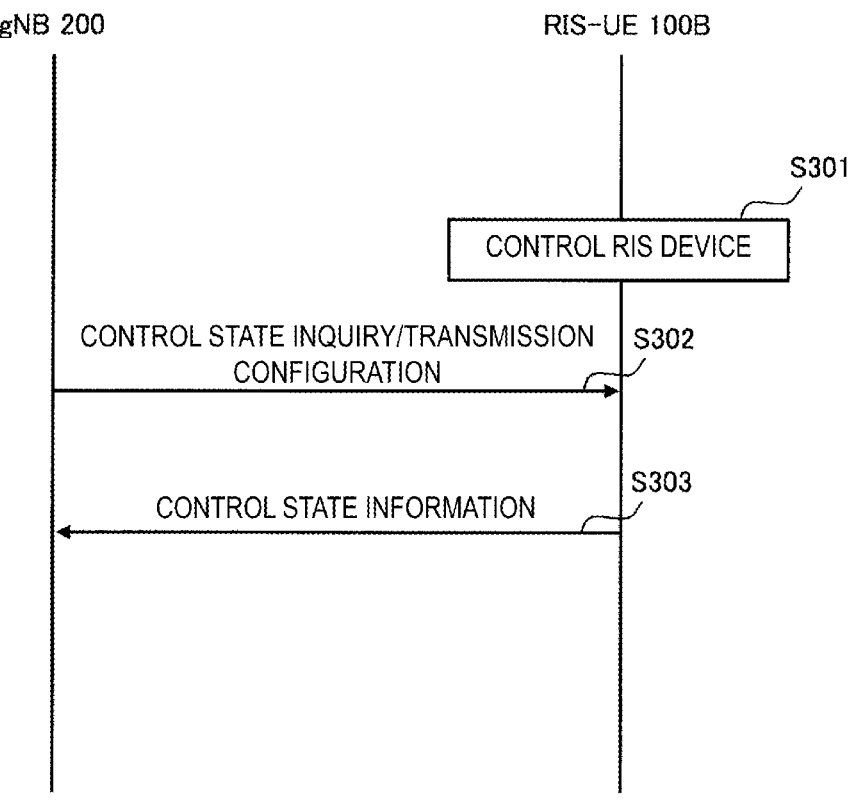
FIG. 23 is a diagram illustrating operations according to a fourth example.

In a fourth example, an example in which the RIS-UE 100B autonomously controls the RIS device 500 and notifies the gNB 200 of the current control state is described. The RIS-UE 100B may autonomously control the RIS device 500, based on auxiliary information from the gNB 200. FIG. 23 is a diagram illustrating operations according to the fourth example.

As illustrated in FIG. 23, in step S301, the RIS-UE 100B (controller 130) autonomously controls the RIS device 500.

In step S302, the gNB 200 (transmitter 210) transmits, to the RIS-UE 100B, a control state inquiry to inquire of the UE 100 about the control state information described above or a control state transmission configuration to configure the control state information transmission described above in the UE 100. The gNB 200 (transmitter 210) may transmit an RRC message including the control state inquiry or the control state transmission configuration to the RIS-UE 100B. The control state transmission configuration may include information to configure a period with which the control state information is transmitted from the RIS-UE 100B to the gNB 200, or information to configure a trigger event in which the control state information is transmitted from the RIS-UE 100B to the gNB 200 (for example, an event that the radio state (RSRP or the like) of the RIS-UE 100B exceeds a threshold, or an event that the radio state of the RIS-UE 100B falls below a threshold).

In step S303, the RIS-UE 100B (transmitter 120) transmits the control state information to the gNB 200, based on the control state inquiry or the control state transmission configuration received from the gNB 200. The gNB 200 (controller 130) grasps the current control state in the RIS-UE 100B (RIS device 500) based on the control state information received from the RIS-UE 100B (transmitter 120).

According to the fourth example, even when the RIS-UE 100B autonomously controls the RIS device 500, the gNB 200 can grasp the current control state.

(5) Fifth Example

Figure 24:
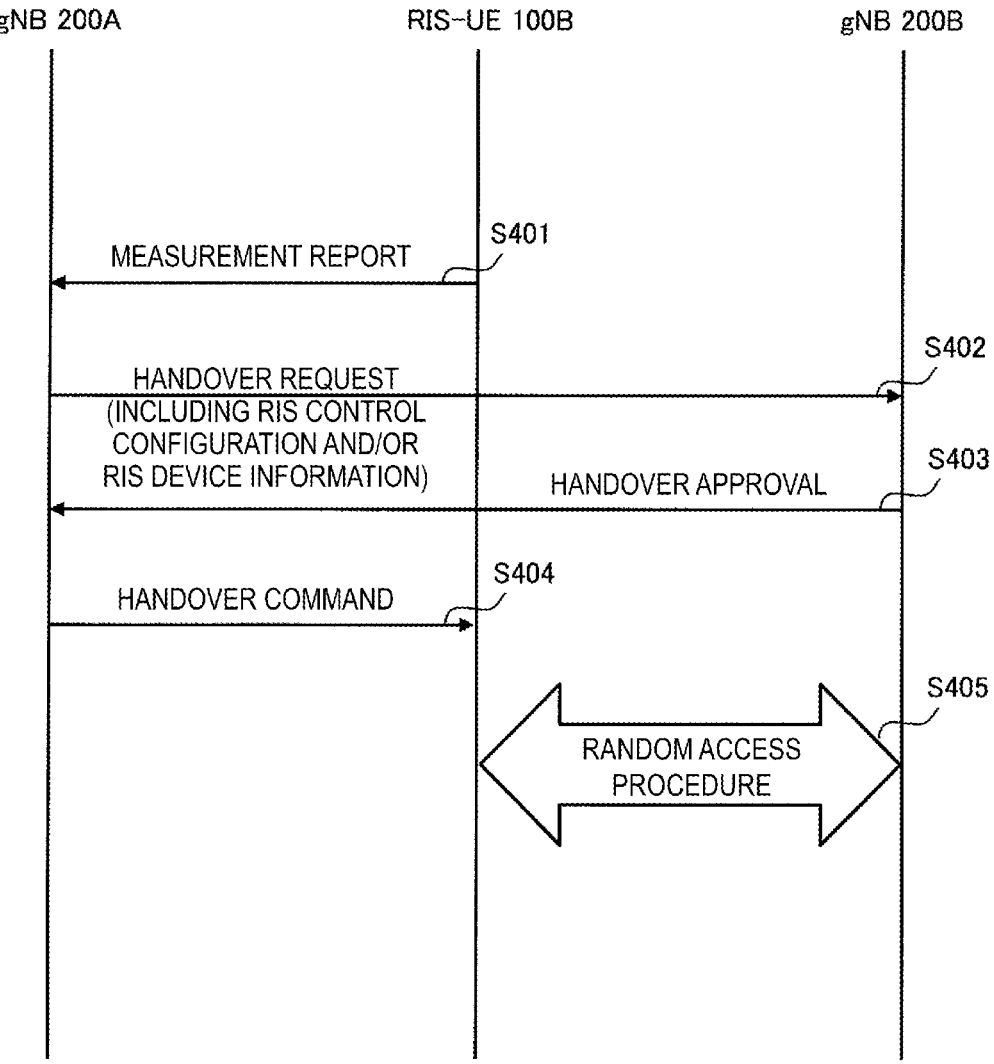
FIG. 24 is a diagram illustrating operations according to a fifth example.

In a fifth example, an example is described in which the RIS-UE 100B performs handover between the gNB s 200. FIG. 24 is a diagram illustrating operations according to the fifth example.

As illustrated in FIG. 24, in step S401, the RIS-UE 100B (controller 130) transmits a measurement report to the gNB 200A. The gNB 200A (controller 230) determines handover of the RIS-UE 100B to the gNB 200B, based on the measurement report received from the RIS-UE 100B.

In step S402, the gNB 200A (backhaul communicator 240) transmits, to the gNB 200B, a handover request message to request the handover of the RIS-UE 100B. Here, the gNB 200A (backhaul communicator 240) may include in the handover request message the RIS control configuration configured in the RIS-UE 100B by the gNB 200A to transmit to the gNB 200B. The gNB 200A (backhaul communicator 240) may include in the handover request message the RIS device information received from the RIS-UE 100B by the gNB 200A to transmit to the gNB 200B.

The gNB 200B (controller 230) determines whether to approve the handover of the RIS-UE 100B based on the handover request received from the gNB 200A. Here, the description continues on the assumption that the handover is determined to be approved.

In step S403, the gNB 200B (backhaul communicator 240) transmits a handover approval message to the gNB 200A. The gNB 200B (backhaul communicator 240) may include in the handover approval message the RIS control configuration to be configured in the RIS-UE 100B after the handover to transmit to the gNB 200A.

In step S404, the gNB 200A (transmitter 210) transmits, to the RIS-UE 100B, a handover command to indicate the handover to the gNB 200B. The gNB 200A (transmitter 210) may include the RIS control configuration received from the gNB 200B in the handover command to transmit to the RIS-UE 100B.

In step S405, the RIS-UE 100B (controller 130) establishes a wireless connection with the gNB 200B by performing a random access procedure with the gNB 200B in response to receiving the handover command. After the handover, the RIS-UE 100B (controller 130) may control the RIS device 500, based on the RIS control configuration included in the handover command.

According to the fifth example, even when the RIS-UE 100B performs handover between the gNBs 200, the handover of the RIS-UE 100B can be appropriately controlled.

Detailed Configuration Example of RIS Device

Figure 25:
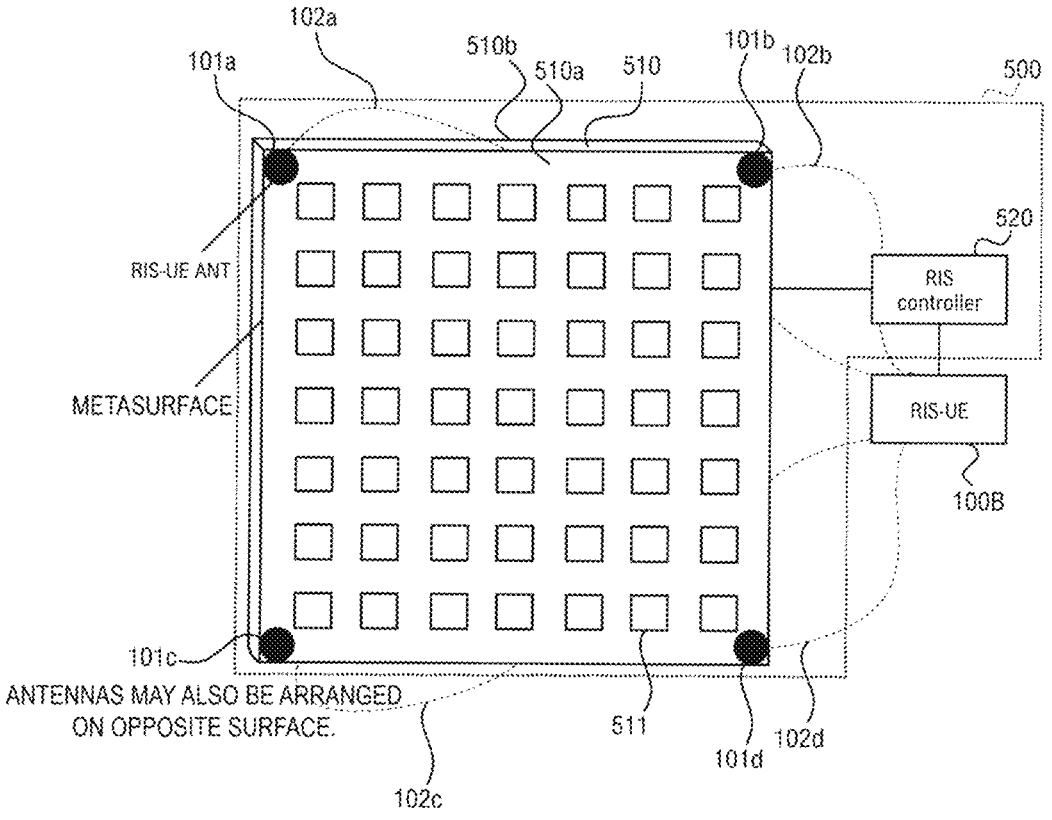
FIG. 25 is a diagram illustrating detailed configuration example 1 of the RIS device according to the embodiment.

A detailed configuration example of the RIS device 500 in an embodiment is described. FIG. 25 is a diagram illustrating detailed configuration example 1 of the RIS device 500 according to the embodiment.

The RIS device 500 according to this configuration example includes the metasurface (RIS) 510 configured to change a propagation direction of a radio wave incident and the RIS controller 520 configured to control the metasurface 510 as described above. The RIS controller 520 controls the metasurface 510 in response to an indication (control signal) from the RIS-UE 100B. The metasurface 510 has a plate-like shape. To be more specific, the metasurface 510 has a main surface 510a on which a radio wave is incident and a back surface 510b opposite to the main surface 510a. The main surface 510a may be a reflective surface that reflects incident radio waves.

The RIS-UE 100B has one or more UE antennas (terminal antennas) 101 to perform wireless communication with the gNB 200. In FIG. 25, an example is illustrated in which the RIS-UE 100B includes four UE antennas 101a to 101d. The UE antennas 101a and 101d are electrically connected to a main body of the RIS-UE 100B via wirings (feed lines) 102a and 102d. In the description of the embodiment, when the UE antennas 101a and 101d are not particularly distinguished from each other, they are simply referred to as the UE antennas 101, and when the wirings 102a and 102d are not particularly distinguished from each other, they are simply referred to as the wirings 102.

In an embodiment, the UE antennas 101 are arranged on the metasurface 510. In other words, the UE antennas 101 are integrally configured with the metasurface 510. Although FIG. 25 illustrates the example in which the UE antennas 101 are arranged on the main surface 510a of the metasurface 510, one or more UE antennas 101 may be arranged on the back surface 510b of the metasurface 510.

Arranging the UE antennas 101 on the metasurface 510 makes it easy to match a radio wave environment of the metasurface 510 with a radio wave environment of the UE antennas 101. When measurement values of reception quality of signals received by the UE antennas 101 of the RIS-UE 100B are reported from the RIS-UE 100B to the gNB 200, the gNB 200 can regard the measurement values as measurement values of reception quality in the metasurface 510. For example, the gNB 200 can grasp whether the radio wave of the gNB 200 reaches the metasurface 510 and can grasp the characteristics of the beam incident on the metasurface 510 from the gNB 200 by using an initial access and the measurement report of the RIS-UE 100B. When measurement values of reception quality of signals received by the UE antennas 101 of the RIS-UE 100B from the UE 100A are reported from the RIS-UE 100B to the gNB 200, the gNB 200 can grasp whether the radio waves of the uplink reach the metasurface 510 and can grasp the characteristics of the beam incident on the metasurface 510 from the UE 100A.

In this configuration example, the UE antennas 101 are arranged on the main surface 510a of the metasurface 510. This makes it easy to accurately grasp conditions of radio waves incident on the metasurface 510 by use of the UE antennas 101.

In this configuration example, the UE antennas 101 are arranged in an end region of the main surface 510a of the metasurface 510. In the example of FIG. 25, the four UE antennas 101a to 101d are arranged at four corners of the main surface 510a of the metasurface 510. Such an arrangement of the UE antennas 101 makes it easy to arrange the UE antennas 101 while avoiding structures 511 provided in the metasurface 510. Note that in the example of FIG. 25, a plurality of structures 511 are arranged in a matrix in the vertical direction and the horizontal direction.

Arranging the plurality of UE antennas 101 on the metasurface 510 makes it easy to, for example, estimate an arrival direction of the radio wave incident on the metasurface 510. Note that although four UE antennas 101a to 101d are arranged in the example of FIG. 25, five or more UE antennas 101 may be arranged on the metasurface 510.

A plurality of UE antennas 101 may be arranged on both surfaces (the main surface 510a and the back surface 510b) of the metasurface 510. Specifically, at least one first antenna among the plurality of UE antennas 101 may be arranged on the main surface 510a, and at least one second antenna among the plurality of UE antennas 101 may be arranged on the back surface 510b. Such an arrangement makes it easy to identify the downlink and the uplink for the metasurface 510 that transmits and refracts radio waves. For example, a plane with high received power in downlink may be determined to be the gNB 200 side and a plane with low received power in downlink may be determined to be the UE 100A side, or a plane with high received power in uplink may be determined to be the UE 100A side plane and a plane with low received power in uplink may be determined to be the gNB 200 side plane.

Figure 26:
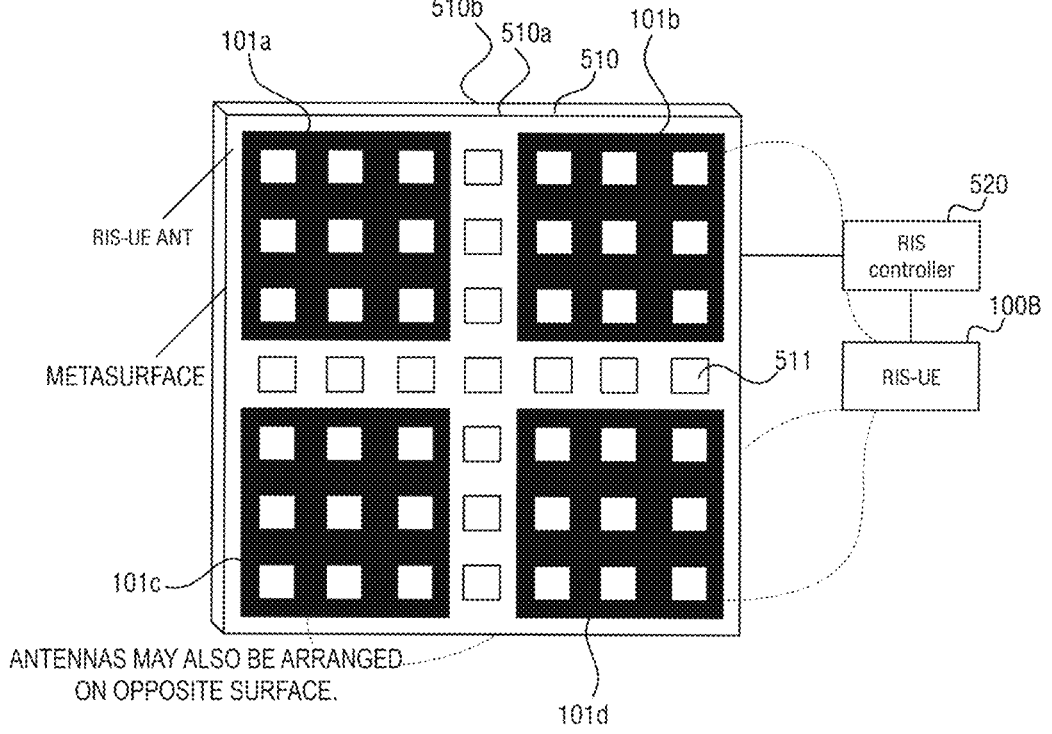
FIG. 26 is a diagram illustrating detailed configuration example 2 of the RIS device according to the embodiment.

FIG. 26 is a diagram illustrating detailed configuration example 2 of the RIS device 500 according to the embodiment.

As illustrated in FIG. 26, an area of each of the UE antennas 101 may be larger than an area of each of the structures 511 spaced apart from each other on the metasurface 510. This is because, for example, when the radio wave to be transmitted and received by the metasurface 510 is at 28 GHz and the radio wave to be transmitted and received for a control signal by the RIS-UE 100B is at 800 MHz, the area of the antenna 101 of the RIS-UE 100B needs to be increased. Note that each UE antenna 101 has a planar pattern that avoids the structures 511.

Figure 27:
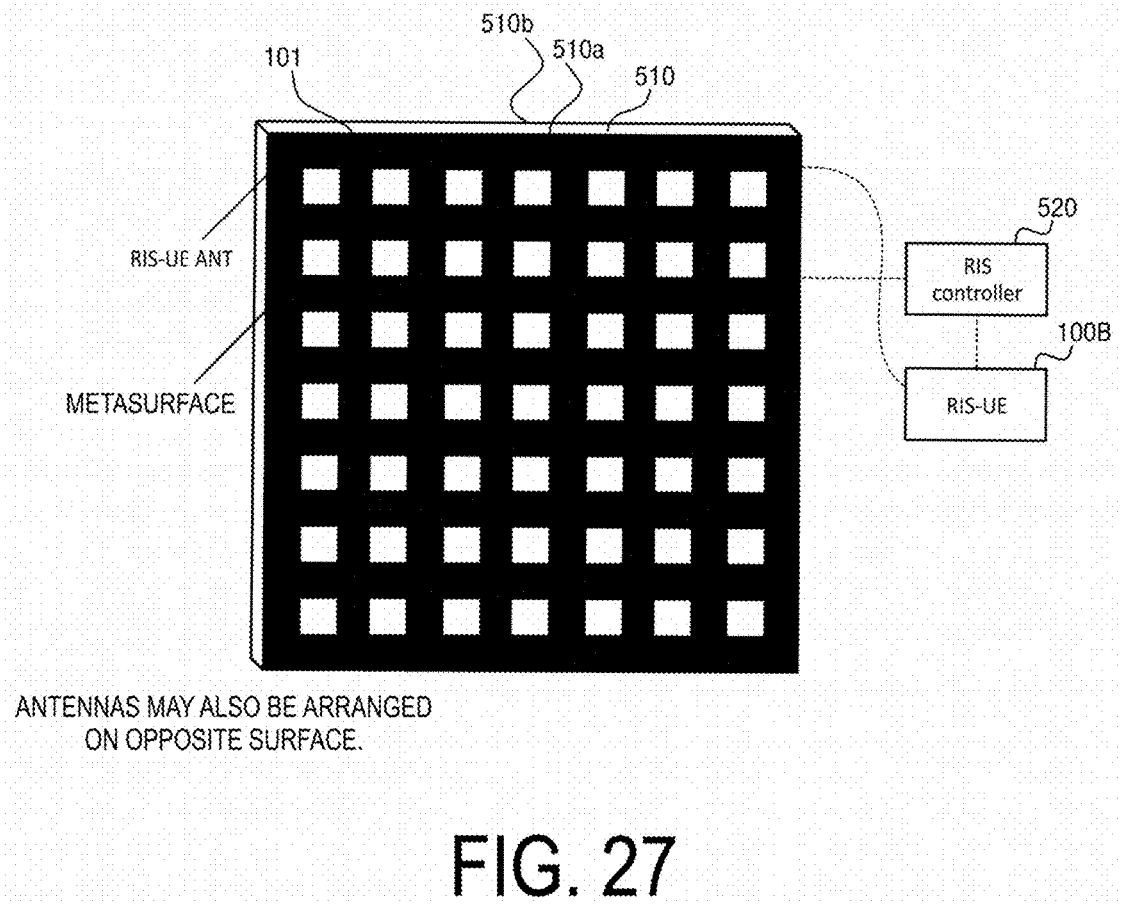
FIG. 27 is a diagram illustrating detailed configuration example 3 of the RIS device according to the embodiment.

FIG. 27 is a diagram illustrating detailed configuration example 3 of the RIS device 500 according to the embodiment.

As shown in FIG. 27, the antennas 101 of the RIS-UE 100B may be provided over the entire main surface 510a of the metasurface 510. One such UE antenna 101 has a planar pattern that avoids the structures 511.

Note that in the examples of FIGS. 25 to 27, the metasurface 510 may have a structure in which a radio wave (for example, at 28 GHz) to be transmitted and received by the metasurface 510 resonates with a radio wave (for example, at 800 MHz) to be transmitted and received for a control signal by the RIS-UE 100B. The antennas 101 of the RIS-UE 100B and the metasurface 510 may share the same frequencies. For example, the radio wave to be transmitted and received by the metasurface 510 and the radio wave to be transmitted and received for a control signal by the RIS-UE 100B may have the same frequency (for example, 28 GHz).

Other Embodiments

The RIS-UE 100B preferably maintains the RRC connected state once connected to the gNB 200 or when RIS control is performed from the gNB 200. When the RIS-UE 100B transitions to the RRC inactive state or the RRC idle state (or when the power of the RIS-UE 100B is turned on), the RIS-UE 100B may control the RIS device 500 in the transmissive mode (refraction angle of 0 degrees) or to have a characteristic as close as possible to the transmissive mode. This can reduce adverse effects such as the RIS device 500 that is not controlled from the gNB 200 unintentionally narrowing the existing coverage area.

The operation flows described above can be separately and independently implemented, and also be implemented in combination of two or more of the operation flows. For example, some steps of one operation flow may be added to another operation flow, or some steps of one operation flow may be replaced with some steps of another operation flow.

In the embodiment described above, an example in which the base station is an NR base station (i.e., a gNB) is described; however, the base station may be an LTE base station (i.e., an eNB). The base station may be a relay node such as an Integrated Access and Backhaul (IAB) node. The base station may be a Distributed Unit (DU) of the IAB node.

A program causing a computer to execute each of the processes performed by the UE 100 (RIS-UE 100B) or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing the processes to be performed by the UE 100 (RIS-UE 100B) or the gNB 200 may be integrated, and at least part of the UE 100 (RIS-UE 100B) or the gNB 200 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

REFERENCE SIGNS

1: Mobile communication system
100: UE
100B: RIS-UE
110: Receiver
120: Transmitter
130: Controller
140: Interface
200: gNB
210: Transmitter
220: Receiver
230: Controller
240: Backhaul communicator
500: RIS device
510: RIS (metasurface)
520: RIS controller

The invention claimed is:

1. A communication control method used in a mobile communication system that comprises a network node and a first wireless terminal configured to perform wireless communication with the network node, the communication control method comprising:

establishing, by the first wireless terminal, a wireless connection with the network node, the first wireless terminal configured to control a first device configured to change a propagation state of a radio wave from the network node;

controlling the first device by the first wireless terminal to change the propagation state of the radio wave between the network node and a user equipment different from the first wireless terminal; and receiving, by the first wireless terminal from the network node through the wireless connection, one or more pieces of control information used to control the first device.

2. The communication control method according to claim 1, wherein the wireless connection is a Radio Resource Control (RRC) connection, and the receiving comprises receiving, by the first wireless terminal, an RRC message comprising the one or more pieces of control information as information elements.

3. The communication control method according to claim 1, wherein the receiving comprises receiving, by the first wireless terminal, a Medium Access Control Control Element (MAC CE) comprising information for configuring a propagation direction of the radio wave as the one or more pieces of control information.

4. The communication control method according to claim 1, further comprising:

receiving, by the first wireless terminal, system information broadcast by the network node;

in a case where the system information includes support information indicating that the network node supports the first wireless terminal configured to control the first device, establishing, by the first wireless terminal, the wireless connection with the network node.

5. The communication control method according to claim 1, wherein the receiving comprises receiving, by the first wireless terminal, control timing information indicating a timing at which the one or more pieces of control information is applied.

6. The communication control method according to claim 5, wherein the one or more pieces of control information are a plurality of pieces of control information, and the control timing information comprises information indicating a timing at which each of the plurality of pieces of control information is applied.

7. A wireless terminal for performing wireless communication with a network node in a mobile communication system, the wireless terminal comprising:

a receiver configured to receive, from the network node through wireless connection with the network node, one or more pieces of control information used to control a first device configured to change a propagation state of a radio wave from the network node; and a controller configured to control the first device to change the propagation state of the radio wave between the network node and a user equipment different from the wireless terminal.

8. A system comprising the wireless terminal according to claim 7 and a network node for performing wireless communication with the wireless terminal.

* * * * *